(12) United States Patent
Enamito et al.

(10) Patent No.: US 12,327,064 B2
(45) Date of Patent: Jun. 10, 2025

(54) ACOUSTIC CONTROL APPARATUS, STORAGE MEDIUM, AND METHOD

(71) Applicant: KABUSHIKI KAISHA TOSHIBA, Tokyo (JP)

(72) Inventors: Akihiko Enamito, Kawasaki (JP); Takahiro Hiruma, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 312 days.

(21) Appl. No.: 17/823,333

(22) Filed: Aug. 30, 2022

(65) Prior Publication Data
US 2023/0297323 A1    Sep. 21, 2023

(30) Foreign Application Priority Data
Mar. 17, 2022  (JP) ................. 2022-042938

(51) Int. Cl.
*G06F 3/16*    (2006.01)
*G10L 15/22*   (2006.01)

(52) U.S. Cl.
CPC ............. *G06F 3/165* (2013.01); *G06F 3/167* (2013.01); *G10L 15/22* (2013.01)

(58) Field of Classification Search
USPC .................................................. 704/235, 275
See application file for complete search history.

(56) References Cited

U.S. PATENT DOCUMENTS

| | | | |
|---|---|---|---|
| 11,310,598 B2 | 4/2022 | Enamito | |
| 11,889,267 B2 * | 1/2024 | Denda | H04R 25/558 |
| 2009/0274309 A1 * | 11/2009 | Pedersen | H04S 7/00 |
| | | | 381/103 |
| 2012/0195447 A1 | 8/2012 | Hiruma et al. | |

(Continued)

FOREIGN PATENT DOCUMENTS

| | | |
|---|---|---|
| JP | 5-161192 A | 6/1993 |
| JP | 8-265071 A | 10/1996 |

(Continued)

OTHER PUBLICATIONS

Japanese Office Action issued Dec. 3, 2024 in Japanese Patent Application No. 2022-042938, (with unedited computer-generated English translation), citing document 15 therein, 5 pages.

*Primary Examiner* — Leonard Saint-Cyr
(74) *Attorney, Agent, or Firm* — Oblon, McClelland, Maier & Neustadt, L.L.P.

(57) ABSTRACT

An acoustic control apparatus includes a processor with hardware. The processor calculates a first relational expression between acoustic filter coefficients of acoustic filters to be applied to voice signals containing information of sounds played back by two or more sound sources, based on an amplification magnification in a sound amplification control point with respect to the sounds played back by the two or more sound sources, and on transfer functions between the sound amplification control point and the two or more sound sources. The processor calculates a second relational expression between the acoustic filter coefficients, based on infor- (Continued)

mation of a frequency of the voice signals, and on an interval between the two or more sound sources. The processor calculates the acoustic filter coefficients based on the first relational expression and the second relational expression.

9 Claims, 17 Drawing Sheets

(56) References Cited

U.S. PATENT DOCUMENTS

| | | | |
|---|---|---|---|
| 2014/0177882 A1 | 6/2014 | Hiruma et al. | |
| 2017/0055066 A1* | 2/2017 | Chamness | H04R 1/2842 |
| 2021/0084411 A1* | 3/2021 | Enamito | G10L 25/51 |

FOREIGN PATENT DOCUMENTS

| | | |
|---|---|---|
| JP | 2012-156865 A | 8/2012 |
| JP | 2014-30159 A | 2/2014 |
| JP | 2016-82443 A | 5/2016 |
| JP | 2021-48468 A | 3/2021 |

* cited by examiner

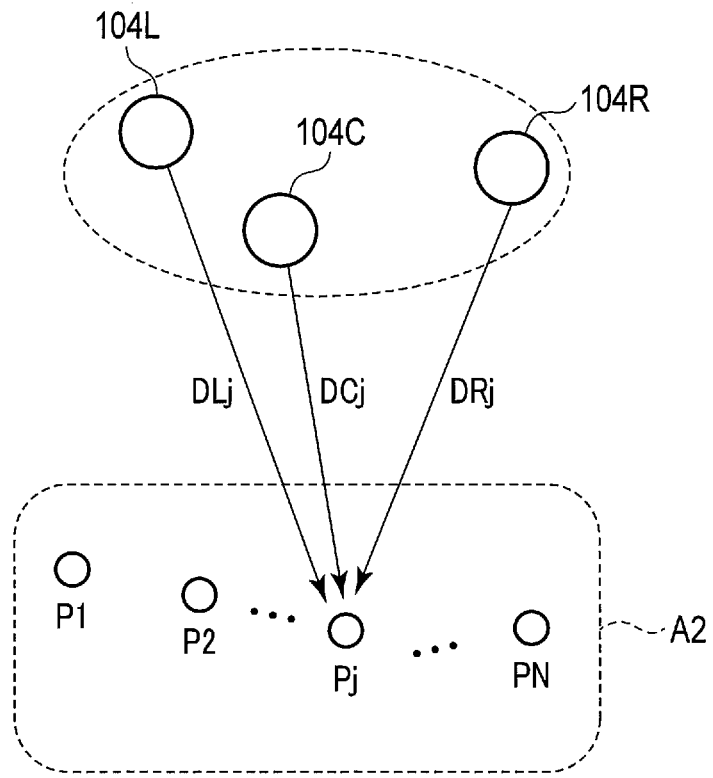
F I G. 4
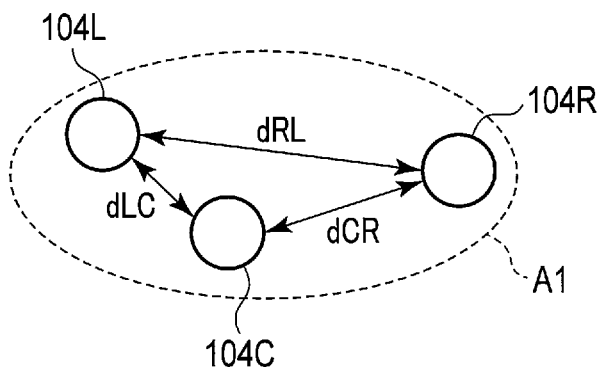
F I G. 5

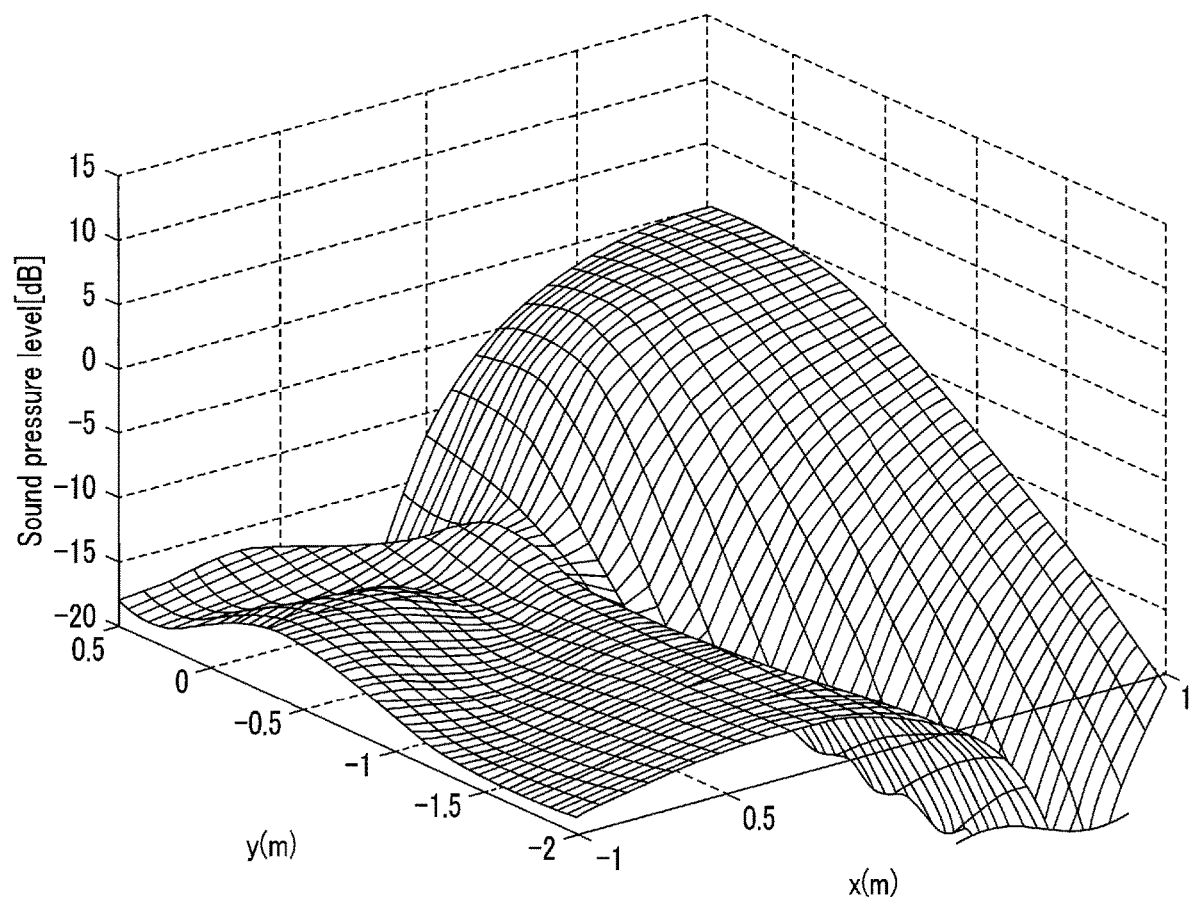
F I G. 6

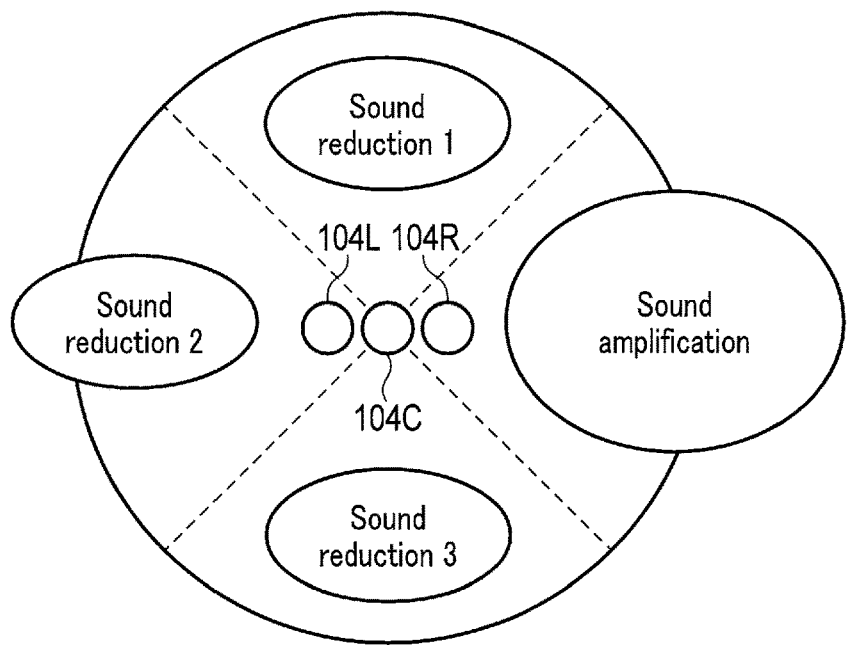
F I G. 7A
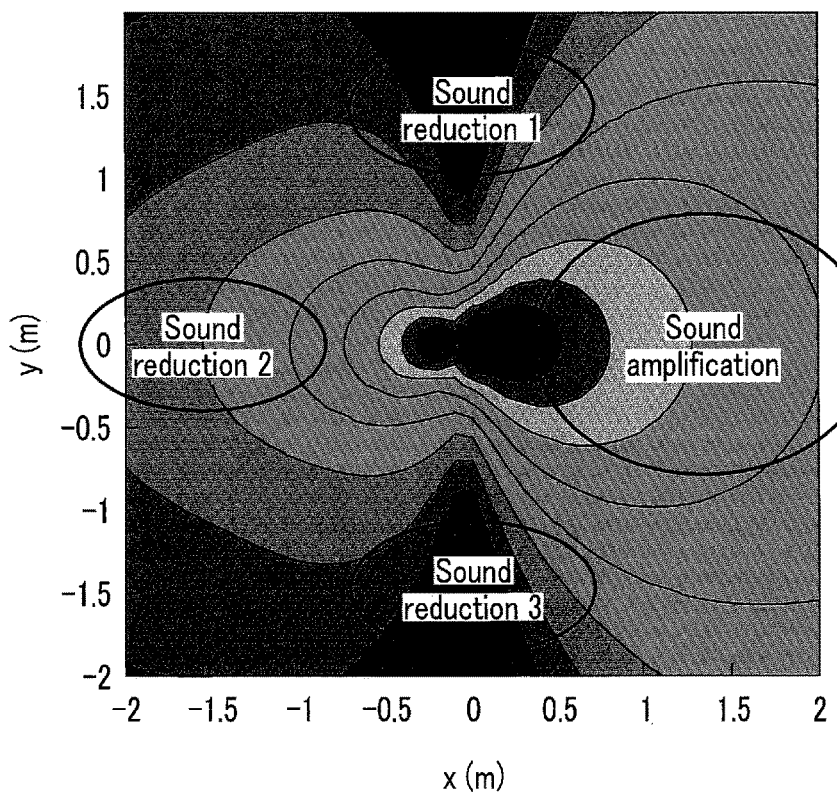
F I G. 7B

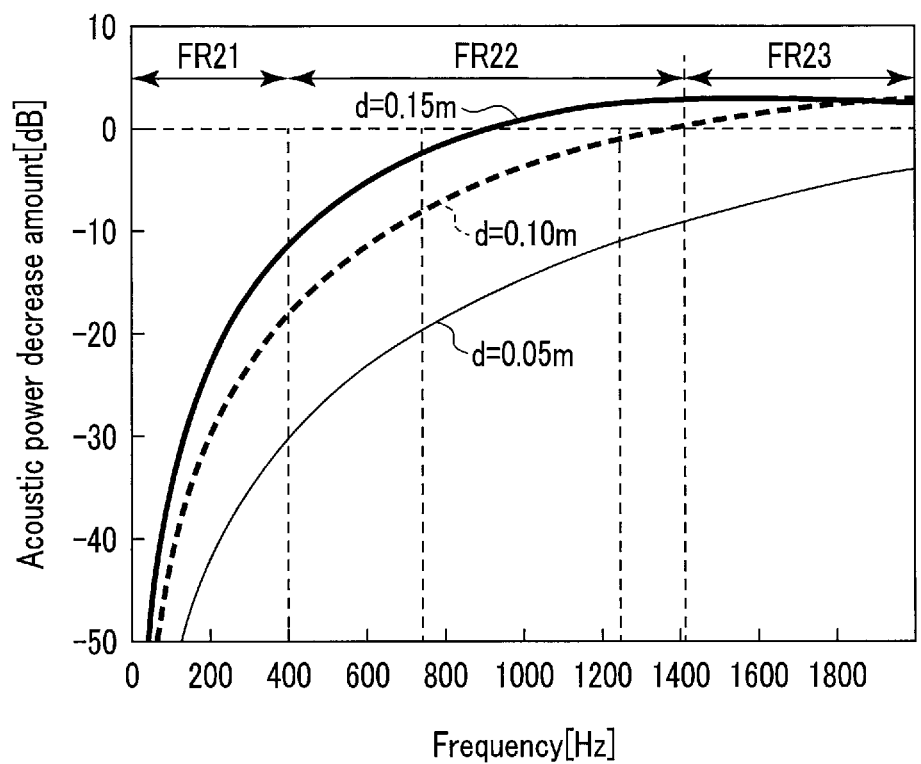
F I G. 12

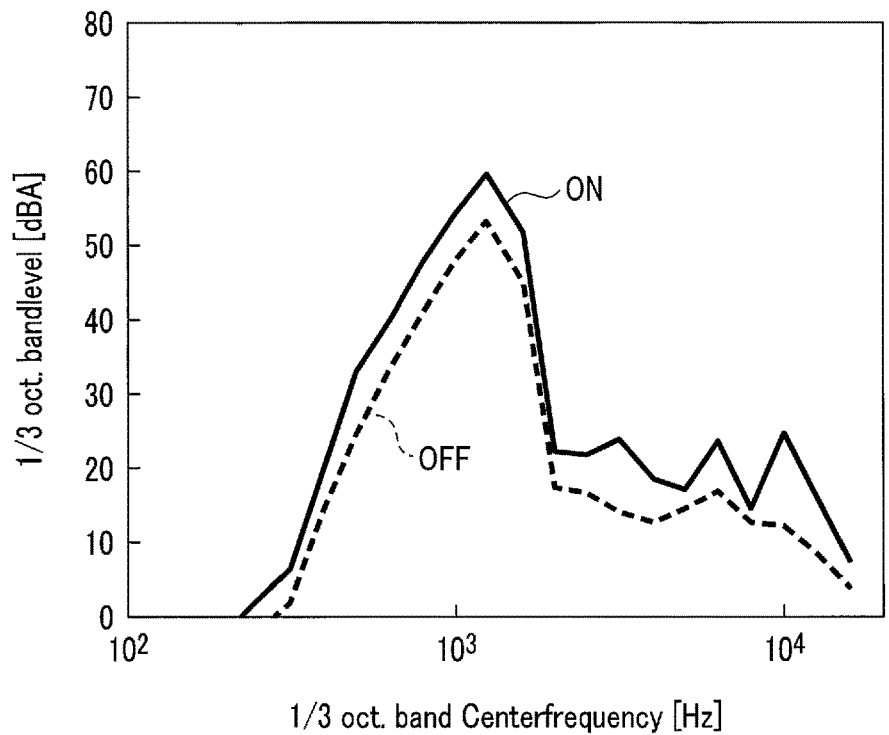
F I G. 13A
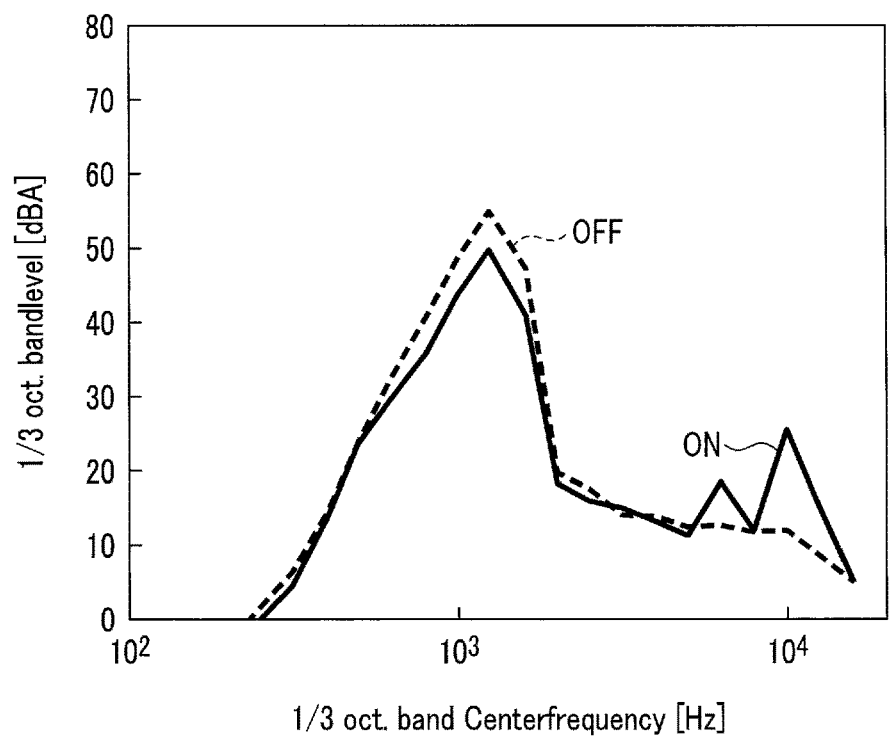
F I G. 13B

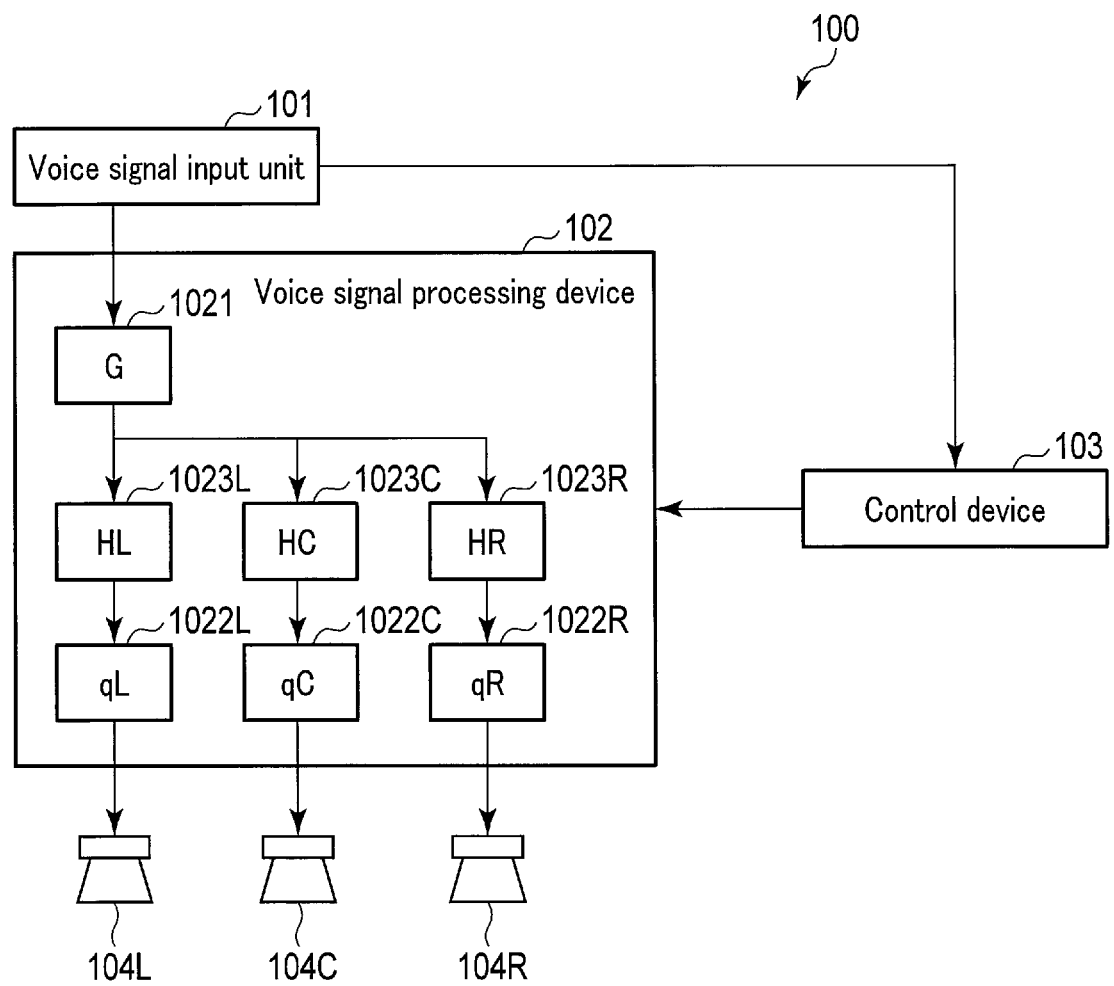
F I G. 14

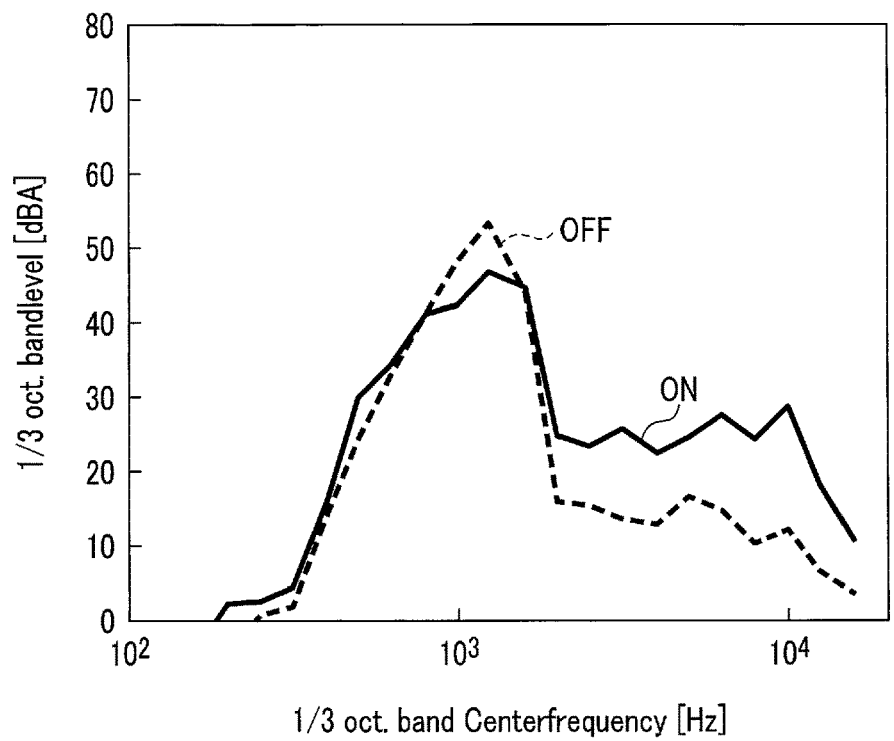
F I G. 16C
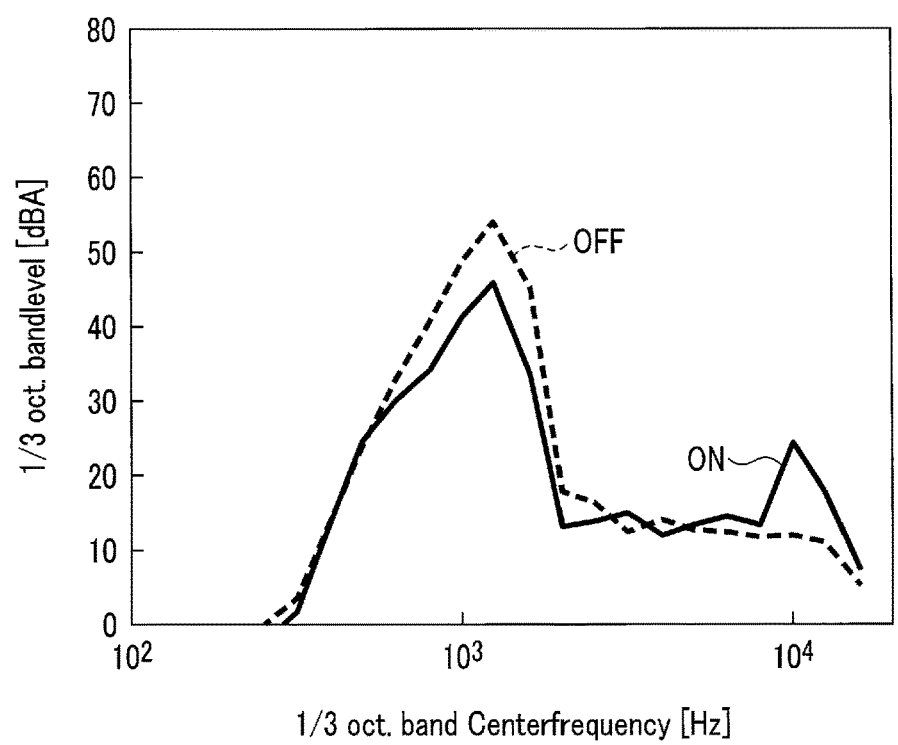
F I G. 16D

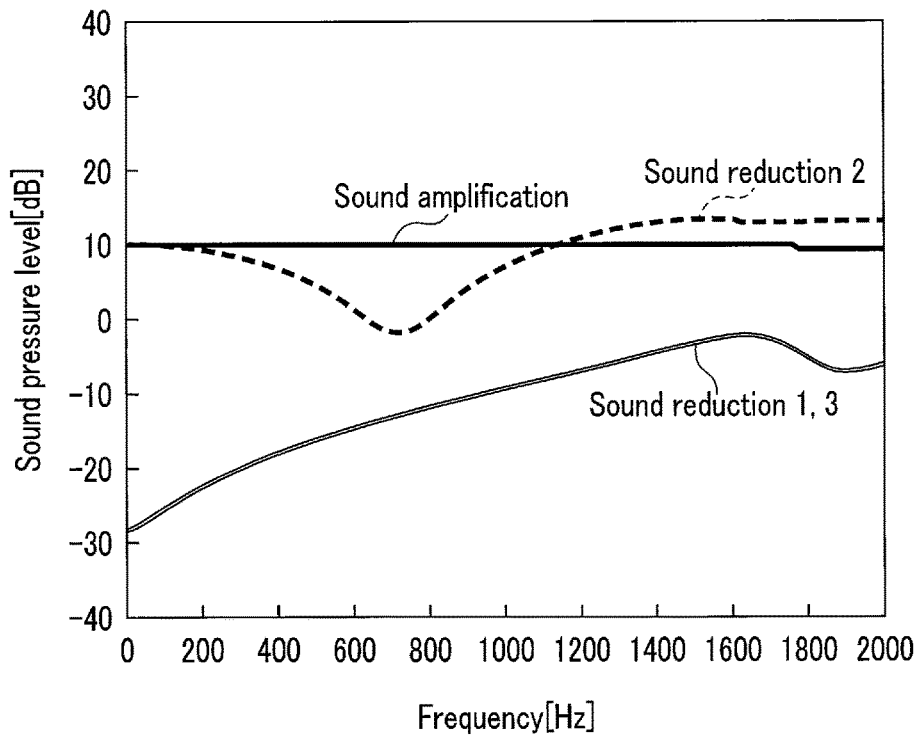
F I G. 18A
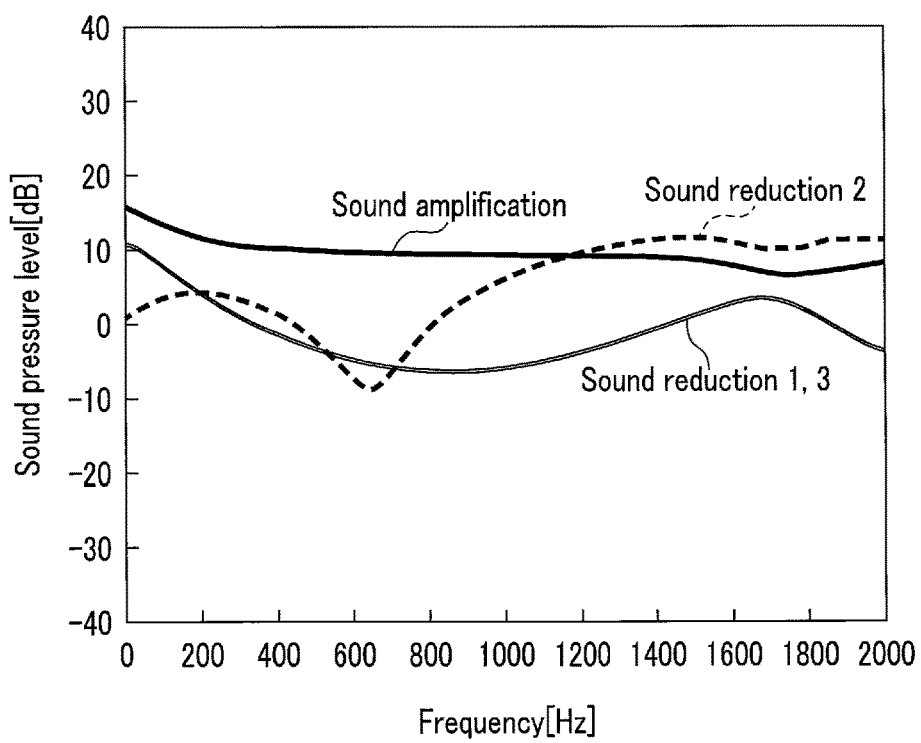
F I G. 18B

ACOUSTIC CONTROL APPARATUS, STORAGE MEDIUM, AND METHOD

CROSS-REFERENCE TO RELATED APPLICATION

This application is based upon and claims the benefit of priority from the Japanese Patent Application No. 2022-042938, filed Mar. 17, 2022, the entire contents of which are incorporated herein by reference.

FIELD

Embodiments described herein relate generally to an acoustic control apparatus, a storage medium, and a method.

BACKGROUND

Various services using voices are utilized. Examples are guidances using voices such as a voice guidance in a public space and a car navigation system, and a voice conversation using an online meeting system. Voices in these kinds of services are useful for a person who requires the guidance and a person who wants to have a conversation, but can be mere noise for a person who does not require the guidance and a person who does not want to have the conversation. That is, an area to which the voice is to be transmitted and an area to which the voice is not to be transmitted changes in accordance with a place using the service and a time zone. Accordingly, demands have arisen for an acoustic control technique that facilitates transmitting a sound in only a specific direction.

BRIEF DESCRIPTION OF THE DRAWINGS

FIG. 4 is a view showing the concept of sound amplification control.

FIG. 5 is a view showing the concept of acoustic power minimization control.

FIG. 6 is a view showing sound pressure level gradients of a sound amplification area and sound reduction areas when a sound is radiated by using an acoustic filter coefficient set in accordance with the result of equation (9).

FIG. 7A is a view showing a set example of a sound amplification area and sound reduction areas.

FIG. 7B is a view showing examples of sound pressure level distributions in the sound amplification area and the sound reduction areas when these areas are set as shown in FIG. 7A and a sound is radiated by using the acoustic filter coefficient set in accordance with the result of equation (9).

FIG. 12 is a view showing the relationship between each speaker interval and the frequency.

FIG. 13A is a view showing the results of an experiment of radiating sounds from speakers by using white noise as a sound source, collecting the sounds by using a microphone placed in the sound amplification area, and measuring the noise level of the collected sound.

FIG. 13B is a view showing the results of an experiment of radiating sounds from speakers by using white noise as a sound source, collecting the sounds by using a microphone placed in a sound reduction area 1, and measuring the noise level of the collected sound.

FIG. 14 is a view showing an example of the configuration of an acoustic control apparatus according to the second embodiment.

FIG. 16C is a view showing the results of an experiment similar to that shown in FIG. 13C, when the experiment was conducted by changing the sound to be radiated from speakers to a traveling wave.

FIG. 16D is a view showing the results of an experiment similar to that shown in FIG. 13D, when the experiment was conducted by changing the sound to be radiated from speakers to a traveling wave.

FIG. 18A is a view showing the calculation results of the relationship between the sound pressure levels in a sound amplification area and sound reduction areas 1, 2, and 3 for each frequency, when gain correction of an acoustic filter coefficient qL is not taken into consideration.

FIG. 18B is a view showing the calculation results of the relationship between the sound pressure levels in the sound amplification area and sound reduction areas 1, 2, and 3 for each frequency, when gain correction of the acoustic filter coefficient qL is taken into consideration.

DETAILED DESCRIPTION

In general, according to an aspect, an acoustic control apparatus includes a processor with hardware. The processor calculates a first relational expression between acoustic filter coefficients of acoustic filters to be applied to voice signals containing information of sounds played back by two or more sound sources, based on an amplification magnification in a sound amplification control point with respect to the sounds played back by the two or more sound sources, and on transfer functions between the sound amplification control point and the two or more sound sources. The processor calculates a second relational expression between the acoustic filter coefficients, based on information of a frequency of the voice signals, and on an interval between the two or more sound sources. The processor calculates the acoustic filter coefficients based on the first relational expression and the second relational expression.

Embodiments will be explained below with reference to the accompanying drawings.

First Embodiment

Figure 1:
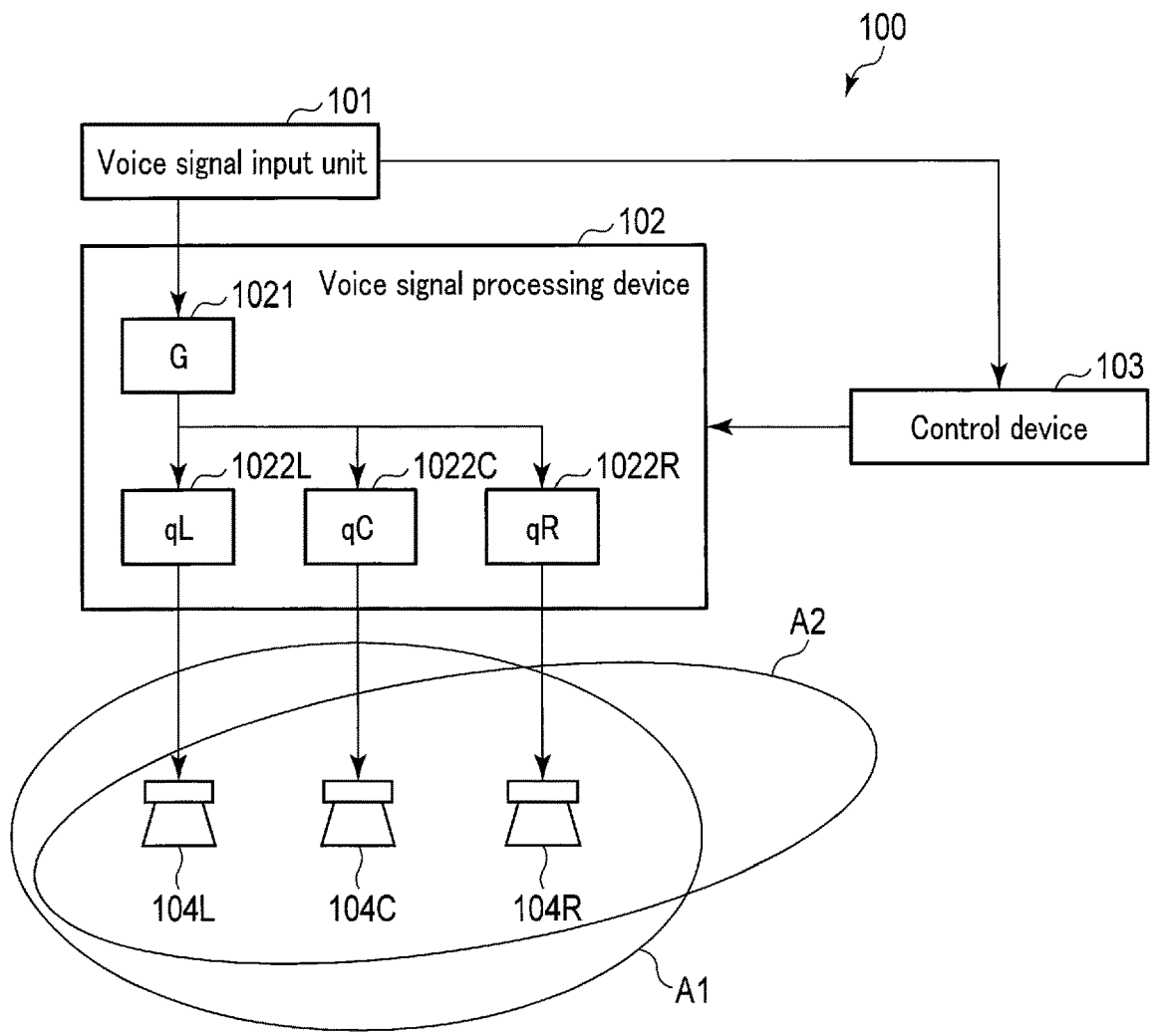
FIG. 1 is a view showing an example of the configuration of an acoustic control apparatus according to the first embodiment.

The first embodiment will be explained below. FIG. 1 is a view showing an example of the configuration of an acoustic control apparatus according to the first embodiment. An acoustic control apparatus 100 includes a voice signal input unit 101, a voice signal processing device 102, a control device 103, and speakers 104L, 104C and 104R. The acoustic control apparatus 100 combines sound amplification control and acoustic power minimization control using the plurality of speakers 104L, 104C, and 104R, thereby silencing a sound reduction area A1 around the speakers 104L, 104C, and 104R and facilitating transmission of a sound to only a specific sound amplification area A2. The sound amplification control increases a sound pressure in a specific direction by controlling the amplitudes of sounds to be radiated from a plurality of speakers. On the other hand, the acoustic power minimization control minimizes acoustic power when a plurality of speakers are regarded as one speaker by controlling the amplitudes and phases of sounds to be radiated from the plurality of speakers.

The voice signal input unit 101 inputs a voice signal to the voice signal processing device 102. The sound signal input unit 101 can also input a voice signal to the control device 103. The voice signal contains sound information. The voice signal is prepared for the purpose of, e.g., playback. The voice signal can be generated each time playback is performed, and can also be input by the user or the control device 103.

The voice signal processing device 102 processes the voice signal. The voice signal processing device 102 includes an amplifier 1021 and acoustic filters 1022L, 1022C, and 1022R.

The amplifier 1021 amplifies the voice signal input from the voice signal input unit 101 by using a gain G. The gain G can be a fixed value, e.g., 1, and can also be designated by the control device 103.

The acoustic filter 1022L filters the voice signal output from the amplifier 1021 in accordance with an acoustic filter coefficient qL designated by the control device 103. Then, the acoustic filter 1022L outputs the filtered voice signal to the speaker 104L. The acoustic filter 1022C filters the voice signal output from the amplifier 1021 in accordance with an acoustic filter coefficient qC designated by the control device 103. Then, the acoustic filter 1022C outputs the filtered voice signal to the speaker 104C. The acoustic filter 1022R filters the voice signal output from the amplifier 1021 in accordance with an acoustic filter coefficient qR designated by the control device 103. Then, the acoustic filter 1022R outputs the filtered voice signal to the speaker 104R. These acoustic filters each pass only a sound in a specific band of the voice signal. The acoustic filter coefficients qL, qC, and qR can be so set as to be equal to the complex volume velocities of the speakers 104L, 104C, and 104R.

The control device 103 calculates the acoustic filter coefficients qL, qC, and qR to be given to the acoustic filters 1022L, 1022C, and 1022R, based on the frequency of the voice signal and the intervals between the speakers 104L, 104C, and 104R. The control device 103 can also set the gain G. The control device 103 will be explained in detail later.

Figure 2:
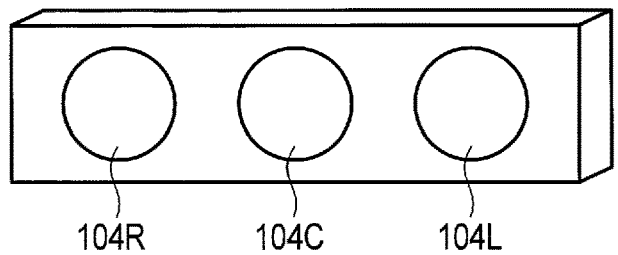
FIG. 2 is a view showing the outer appearance of an example of the speaker configuration.

Each of the speakers 104L, 104C, and 104R is a sound source for radiating a sound corresponding to the filtered voice signal output from the corresponding acoustic filter. As shown in FIG. 2, the speakers 104L, 104C, and 104R are integrally arranged side by side in an oblong housing. Assuming that FIG. 2 shows the front surface, the speaker 104L operates as a left-side speaker, the speaker 104C operates as a center speaker, and the speaker 104R operates as a right-side speaker. In this arrangement shown in FIG. 2, the interval between the speakers 104L, 104C, and 104R is a fixed value. It is not always necessary to integrally arrange the speakers 104L, 104C, and 104R. On the other hand, the speakers 104L, 104C, and 104R are desirably arranged close to each other to some extent, for the purposes of the sound power minimization control and the sound amplification control. In addition, the housing shown in FIG. 2 can also accommodate the voice signal input unit 101, the voice signal processing device 102, and the control device 103.

Figure 3:
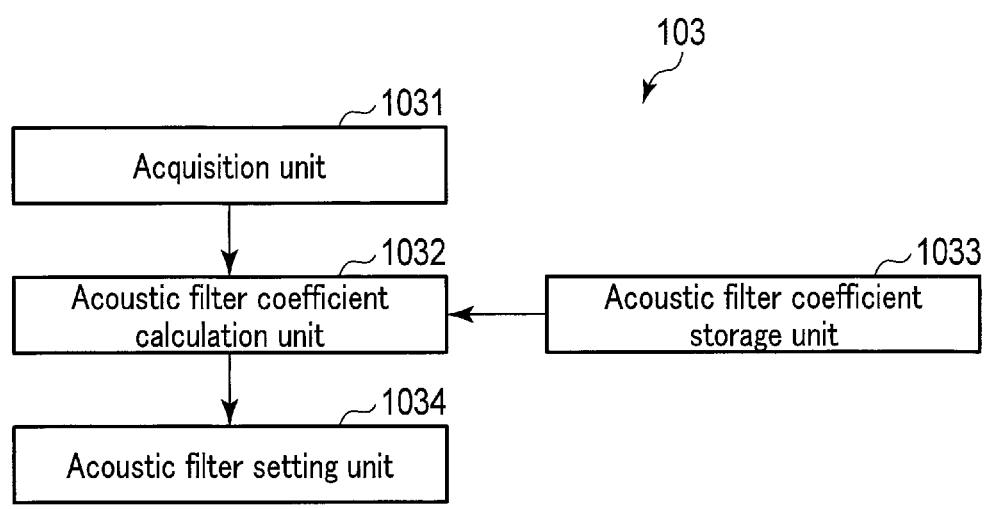
FIG. 3 is a block diagram showing elements included in the control apparatus.

The control device 103 will now be explained. FIG. 3 is a block diagram showing elements included in the control device 103. The control device 103 includes an acquisition unit 1031, an acoustic filter coefficient calculation unit 1032, an acoustic filter coefficient memory 1033, and an acoustic filter setting unit 1034.

The acquisition unit 1031 acquires various kinds of information necessary to calculate acoustic filter coefficients. Then, the acquisition unit 1031 inputs the acquired information to the acoustic filter coefficient calculation unit 1032. The information acquired by the acquisition unit 1031 contains, e.g., a frequency, speaker intervals, and transfer functions.

The frequency is the frequency of a voice signal to be input from the voice signal input unit 101. The acquisition unit 1031 acquires information of the frequency from, e.g., the voice signal input unit 101. Note that the frequency can be converted into a wavenumber when the sound velocity is known. Since the calculation of the acoustic filter coefficient uses the wavenumber as will be explained later, the acquisition unit 1031 can also acquire information of the wavenumber from the voice signal input unit 101. Furthermore, when the frequency of the voice signal is a fixed value, the acquisition unit 1031 can input information of the frequency having a prestored fixed value to the acoustic filter coefficient calculation unit 1032.

The speaker intervals are the intervals between the plurality of speakers. The acquisition unit 1031 acquires the speaker intervals based on, e.g., an input from the user. The speaker intervals can be either equal to each other or different from each other. Note that when the speakers are fixed, the speaker intervals are handled as fixed values. In this case, the acquisition unit 1031 can input information of speaker intervals having prestored fixed values to the acoustic filter coefficient calculation unit 1032.

The transfer functions are functions representing the transmission characteristics between a sound amplification control point and the speakers 104L, 104C, and 104R, and determined by the positional relationship between the sound amplification control point and the speakers 104L, 104C, and 104R. The sound amplification control point is a control target position of the sound amplification control. The transfer functions are represented by matrices containing, as elements, a spatial transmission characteristic CL of a sound transmitted from the speaker 104L to the sound amplification control point, a spatial transmission characteristic CC of a sound transmitted from the speaker 104C to the sound amplification control point, and a spatial transmission characteristic CR of a sound transmitted from the speaker 104R to the sound amplification control point. The spatial transmission characteristics can be measured in, e.g., an anechoic room or audio-visual room having little sound reflection, from microphone acquisition signals obtained by radiating sounds based on a random signal or a TSP (Time Stretched Pulse) signal from the speakers 104L, 104C, and 104R, and collecting the sounds by using a microphone placed in the position of the sound amplification control point. The acquisition unit 1031 acquires the transfer functions thus measured. Note that when the positions of the speakers 104L, 104C, and 104R and the position of the sound amplification control point are fixed, the transfer functions are handled as fixed transfer functions. In this case, the acquisition unit 1031 can input prestored fixed transfer functions to the acoustic filter coefficient calculation unit 1032.

The acoustic filter coefficient calculation unit 1032 receives the various kinds of information from the acquisition unit 1031, receives the acoustic filter coefficient of at least one speaker from the acoustic filter coefficient memory 1033, and calculates acoustic filter coefficients of the remaining speakers. Then, the acoustic filter coefficient calculation unit 1032 inputs the acoustic filter coefficients to the acoustic filter setting unit 1034. The calculation of the acoustic filter coefficient will be explained in detail later.

The acoustic filter coefficient memory 1033 stores the acoustic filter coefficient of at least one of the speakers 104L, 104C, and 104R. For example, the acoustic filter coefficient memory 1033 stores the acoustic filter coefficient of the speaker 104C. The acoustic filter coefficient memory 1033 can be installed when the number of speakers is 3 or more. When the number of speakers is m (m≥3), the acoustic filter coefficient memory 1033 stores at least (m−2) acoustic filter coefficients.

The acoustic filter setting unit 1034 sets the acoustic filter coefficients calculated by the acoustic filter coefficient calculation unit 1032 in the acoustic filters 1022L, 1022C, and 1022R.

Next, the calculation of the acoustic filter coefficient in the acoustic filter coefficient calculation unit 1032 will be explained. As described earlier, the acoustic control apparatus 100 according to the embodiment performs the sound amplification control and the acoustic power minimization control by combining them using the plurality of speakers 104L, 104C, and 104R. Each of the sound amplification control and the acoustic power minimization control will be explained below.

First, the sound amplification control will be explained. FIG. 4 shows the concept of the sound amplification control. FIG. 4 shows the sound amplification control using the three speakers 104L, 104C, and 104R.

The sound amplification control multiplies the sound pressure energy in the sound amplification area A2 by n. That is, letting $Q_{OFF}$ be the sound pressure energy in the sound amplification area A2 before the sound amplification control and $Q_{ON}$ be the sound pressure energy in the sound amplification area A2 after the sound amplification control, sounds to be radiated from the speakers 104L, 104C, and 104R are controlled such that the relationship of equation (1) below holds. Note that in this embodiment, "before the sound amplification control" means a state in which a sound is radiated from only the speaker 104C as a reference.

$$Q_{on} = nQ_{off} \tag{1}$$

Assume that the sound amplification area A2 has N sound amplification control points, the sound pressure at each sound amplification control point before the sound amplification control is Pj (j=1, 2, . . . , N), the sound pressure at each sound amplification control point after the sound amplification control is P'j (j=1, 2, . . . , N), a transfer function between the speaker 104L and each sound amplification control point is DLj (j=1, 2, . . . , N), a transfer function between the speaker 104C and each sound amplification control point is DCj (j=1, 2, . . . , N), a transfer function between the speaker 104R and each sound amplification control point is DRj (j=1, 2, . . . , N), the complex volume velocity of the speaker 104L is qL, the complex volume velocity of the speaker 104C is qC, and the complex volume velocity of the speaker 104R is qR. In this case, the sound pressure energies $Q_{OFF}$ and $Q_{ON}$ in the sound amplification are A2 are the sum total of the sound pressure energies at each sound amplification control point, and are respectively calculated as indicated by equations (2) and (3) below. In equations (2) and (3), symbol * represents a complex conjugate. Note that when j is 1, i.e., when the number of sound amplification control points is 1, the sound pressure energy is equal to the sound pressure at that sound amplification control point.

$$Q_{OFF} = \Sigma_{j=1}^{N} P_j \cdot P_j^* = DLj \cdot qL + DCj \cdot qC + DRj \cdot qR \cdot qR \tag{2}$$

$$Q_{ON} = \Sigma_{j=1}^{N} P'j \cdot P'^*Pj = DCj \cdot qC \tag{3}$$

As described above, the acoustic filter coefficients can be set such that the complex volume velocities of the speakers 104L, 104C, and 104R become equal. Accordingly, acoustic filter coefficients necessary for the sound amplification control are calculated by calculating qL, qC, and qR when the relational expression of the sound amplification control indicated by equation (1) holds. As will be explained later, one relational expression is derived for each of the sound amplification control and the acoustic power minimization control. Therefore, qL, qC, and qR are calculated when at least one of qL, qC, and qR is predetermined. In the embodiment, the acoustic filter coefficient memory 1033 stores, e.g., qC as a fixed value, e.g., 1. Accordingly, it is only necessary to determine the acoustic filter coefficients qR and qL. Equation (4) is obtained by rearranging equations (1), (2), and (3) with respect to qL. Equation (4) is the first relational expression for the acoustic filter coefficient qL derived from the sound amplification control. Although the equations are rearranged for qL in this example, they may also be rearranged for qR.

$$qL = -\frac{(1-n)\cdot \Sigma\, DCj\cdot DCj^*\cdot qC + \Sigma\, DRj\cdot DRj^*\cdot qR}{\Sigma\, DLj\cdot DLj^*} \quad (4)$$

The acoustic power minimization control will now be explained. FIG. 5 shows the concept of the acoustic power minimization control. Like FIG. 4, FIG. 5 shows the acoustic power minimization control using the three speakers 104L, 104C, and 104R.

The acoustic power minimization control minimizes the acoustic power in the sound reduction area A1 around the speakers. Acoustic power W of one sound source is calculated by equation (5) below. In equation (5), Re is a symbol representing that a real part in the parentheses is taken, w indicates the angular frequency, p indicates the medium, typically the air density, k indicates the wavenumber, qL, qC, and qR indicate the complex volume velocities of the corresponding sound sources, and dLC, dRT, and dCR indicate the speaker intervals between the corresponding speakers. Also, symbol * indicates the complex conjugate like equations (2) and (3). The unit of the acoustic power is, e.g., W, and the unit of the complex volume velocity is, e.g., m$^3$/s. As can be seen from these units, the acoustic power indicates the energy of sound per unit time. The acoustic power is an absolute value determined by the sound source and independent of the position from the sound source.

$$W = \frac{1}{2}\mathrm{Re}[p^*q] = \frac{\omega\rho k}{8\pi}\frac{\sin kd}{kd}q^*q \quad (5)$$

$$p = zq = \frac{j\omega\rho}{4\pi r}e^{jkr^*}\rho$$

Equation (5) is the acoustic power of one sound source. The acoustic power W of, e.g., three sound sources as shown in FIG. 5 is calculated by equation (6) below:

$$W = \alpha(qL\cdot qL^* + qL\cdot qC^* \mathrm{sinc}kdLC + qL\cdot qR^*\mathrm{sinc}kdRL + \quad (6)$$
$$qC\cdot qC^* + qC\cdot qL^*\mathrm{sinc}kdLC + qC\cdot qR^*\mathrm{sinc}kdCR +$$
$$qR\cdot qR^* + qR\cdot qL^*\mathrm{sinc}kdRL + qR\cdot qC^*\mathrm{sinc}kdCR)$$

$$\alpha = \frac{\omega\rho k}{8\pi},\ \mathrm{sinc}kd = \frac{\sin kd}{kd}$$

Acoustic filter coefficients necessary for the acoustic power minimization control are calculated by calculating qL, qC, and qR that minimize the acoustic power W of equation (6). For this purpose, a partial differentiation calculation indicated by equation (7) is performed.

$$\frac{\partial W}{\partial qL^r} = 0,\ \frac{\partial W}{\partial qL^i} = 0 \quad (7)$$

$$qL = qL^r + jqL^i,\ qL^* = qL^r - jqL^i$$

Equation (8) is obtained by rearranging the result of equation (7) for qL. Equation (8) is the second relational expression for the acoustic filter qL derived from the acoustic power minimization control.

$$qL = -\left(\frac{\sin kdLC}{kdLC}qC + \frac{\sin kdRL}{kdRL}qR\right) \quad (8)$$

Since qC is predetermined, qC=1 is substituted in equations (4) and (8), and the results are rearranged for qR. Consequently, qL, qC, and qR that achieve both the sound amplification control and the acoustic power minimization control are obtained as indicated by equation (9) below:

$$qC = 1 \quad (9)$$

$$qR = \frac{DLj\sin kdLC - (1-n)DCj}{DLj\mathrm{sinc}kdRL - DRj}qC$$

$$qL = -\left(\frac{\sin kdLC}{kdLC}qC + \frac{\sin kdRL}{kdRL}qR\right)$$

As indicated by equation (9), qL and qR are functions of a kd value as the product of the wavenumber k and the speaker interval, and transfer functions DLj, DCj, and DRj between the speakers and the sound amplification control points in the sound amplification area. The kd value is a dimensionless quantity equivalent to a phase, and can be determined by the frequency of a sound radiated from a speaker and the speaker interval if the sound velocity is determined. Also, the transfer functions can be measured in, e.g., an anechoic room or audio-visual room having little sound reflection, by radiating sounds based on a random signal or sounds based on a TSP (Time Stretched Pulse) signal from the speakers 104L, 104C, and 104R, and collecting the sounds by a microphone placed in the position of a sound amplification control point.

As is apparent from equation (6), the acoustic power W is a function of the kd value, so the kd value determines the acoustic power decrease amount in the acoustic power minimization control. The same acoustic power decrease amount is obtained as long as the kd value is constant, even when the frequency or the speaker interval has changed.

FIG. 6 shows sound pressure level gradients in the sound amplification area and the sound reduction areas when a sound is radiated by the acoustic filter coefficients set in accordance with the results of equation (9). The x-axis and y-axis shown in FIG. 6 indicate distances from the origin when the position of, e.g., the speaker 104C is set as the origin. Also, the ordinate of FIG. 6 indicates the sound pressure level. Referring to FIG. 6, a region in which the decrease amount of the sound pressure level is small, e.g., an area in which +0.75≤x≤+1 and 0≤y≤0.5 (the unit is meter in both the inequalities) is the sound amplification area. That is, the acoustic control apparatus 100 can form the sound amplification area and the sound reduction areas in a relatively narrow space, e.g., a 2 m×2 m space, around the speakers 104L, 104C, and 104R. As the sound pressure level gradient between the sound amplification area and the sound reduction area shown in FIG. 6 increases, the sound radiated from the speaker is heard more in only the sound amplification area. The sound pressure level gradient increases when the sound amplification amount obtained by the sound amplification control increases and the acoustic power decrease amount obtained by the acoustic power minimization control increases.

FIG. 7A is a view showing a setting example of the sound amplification area and the sound reduction areas. In FIG. 7A, the sound amplification area is set to the right of the speakers 104L, 104C, and 104R arranged side by side. In this case, the sound reduction areas are set in front of, at the back of, and to the left of the speakers 104L, 104C, and 104R. Referring to FIG. 7A, a sound reduction area 1 is set in front of the speakers 104L, 104C, and 104R, a sound reduction area 2 is set to the left of the speakers 104L, 104C, and 104R, and a sound reduction area 3 is set at the back of the speakers 104L, 104C, and 104R.

FIG. 7B shows an example of the distribution of the sound pressure levels in the sound amplification area and the sound reduction areas, when these areas are set as shown in FIG. 7A and the sound is radiated by the acoustic filter coefficients set in accordance with the results of equation (9). This distribution shown in FIG. 7B represents the size of the sound pressure level by the density. As shown in FIG. 7B, when the sound amplification area is set to the right of the speakers 104L, 104C, and 104R, the sound pressure level in the sound amplification area increases, and the sound pressure levels in the sound reduction areas 1, 2, and 3 decrease. The comparison of the sound reduction areas 1, 2, and 3 shows that the decrease amounts in the sound reduction areas 1 and 3 are larger than that in the sound reduction area 2. When the speaker 104C is set as a reference, the sounds of the speakers 104R and 104L have an opposite-phase relationship. In the sound reduction areas 1 and 3, therefore, the decrease of the acoustic power caused by the interference between the sounds radiated from the speakers 104L and 104R is larger than that in the sound reduction area 2.

Figure 8:
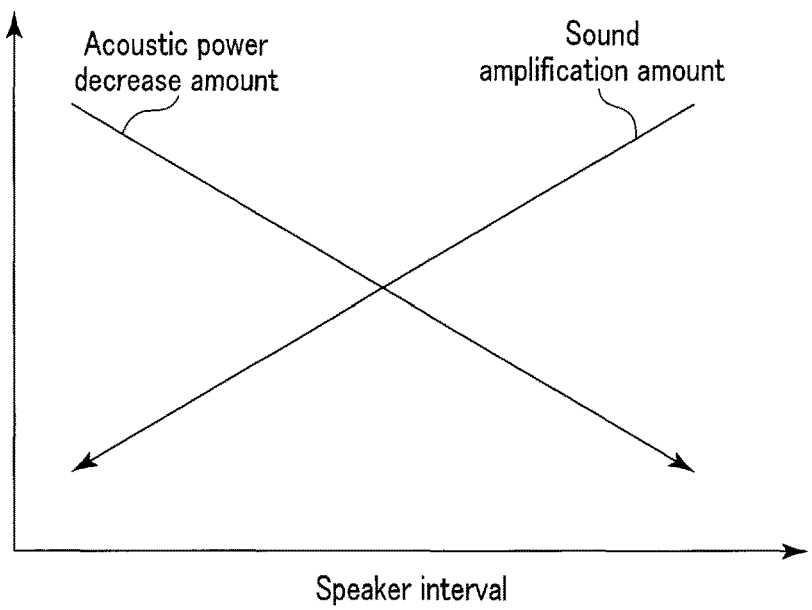
FIG. 8 is a view showing the relationship between sound amplification control and acoustic power minimization control with respect to a speaker interval.

FIG. 8 is a view showing the relationship between the sound amplification control and the acoustic power minimization control with respect to the speaker interval. The abscissa of FIG. 8 indicates the speaker interval. The ordinate of FIG. 8 indicates the effect amounts of the sound amplification control and the acoustic power minimization control. That is, the ordinate of FIG. 8 indicates the sound amplification amount in the case of the sound amplification control, and the acoustic power decrease amount as the decrease amount of the acoustic power level in the case of the acoustic power minimization control. As shown in FIG. 8, the effect of the sound amplification control and that of the acoustic power minimization control have a tradeoff relationship. More specifically, the acoustic power decrease amount decreases as the speaker interval increases. On the other hand, the sound amplification amount increases as the speaker interval increases. Accordingly, it is important to find out an optimum speaker interval in order to increase the sound pressure level gradient shown in FIG. 6. Although FIG. 8 shows the relationship between the sound amplification control and the acoustic power minimization control with respect to the speaker interval, the effect of the sound amplification control and that of the acoustic power minimization control similarly have the tradeoff relationship with respect to the frequency. More specifically, the acoustic power decrease amount decreases as the frequency increases, and the sound amplification amount increases as the frequency increases.

Figure 9:
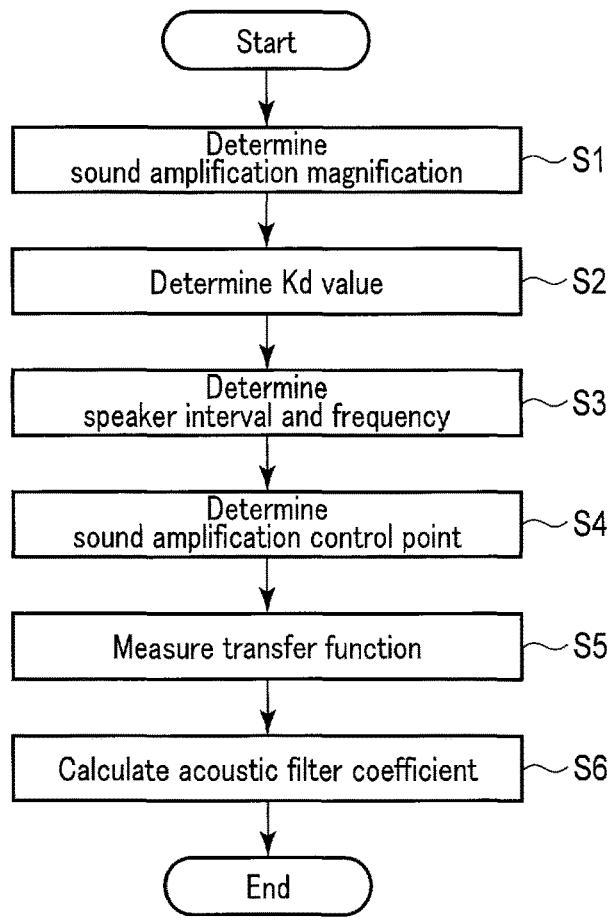
FIG. 9 is a flowchart showing the flow of spatial sound field design including the determination of the speaker interval and a frequency.

FIG. 9 is a flowchart showing the flow of a spatial sound field design including the determination of the speaker interval and the frequency. This processing shown in FIG. 9 is performed when setting the acoustic filter coefficients in the acoustic filter setting unit 1034.

In step S1, the control device 103 determines a sound amplification magnification n. The sound amplification magnification n is appropriately determined in accordance with the use environment in which the user actually uses the acoustic control apparatus 100. The sound amplification magnification n can be a fixed value such as 2, and can also be determined by accepting an input from the user or a worker in charge of setting the acoustic control apparatus 100. For example, when the sound amplification magnification n is set at 2, the acoustic filter coefficients are calculated so that a sound amplification amount of 6 dB is obtained.

In step S2, the control device 103 determines the kd value. The kd value is appropriately determined in accordance with the acoustic power decrease amount required by the acoustic power minimization control. The kd value can be a fixed value, and can also be determined by accepting an input value from the user or a worker in charge of setting the acoustic control apparatus 100. In addition, the processing in step S2 can be omitted if the speaker interval and the frequency are fixed values.

In step S3, the control device 103 determines the speaker interval and the frequency based on the kd value. A method of determining the speaker interval and the frequency will be explained below.

Figure 10:
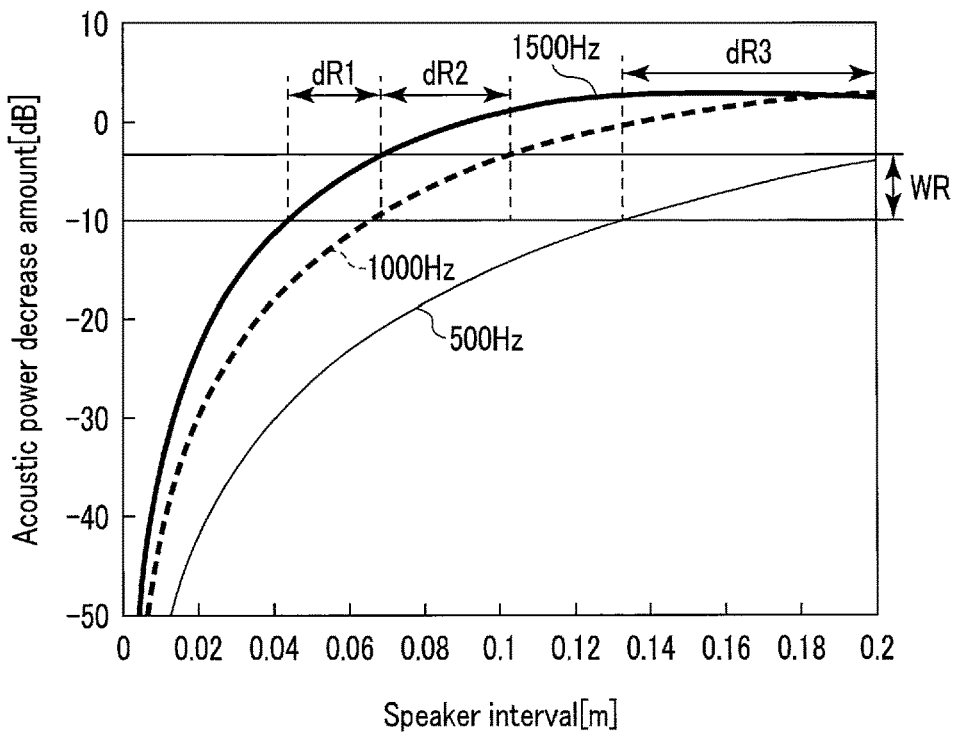
FIG. 10 is a view showing the relationship between the speaker interval and an acoustic power decrease amount in acoustic power minimization control for each frequency.

FIG. 10 is a view showing, for each frequency, the relationship between the speaker interval and the acoustic power decrease amount in the acoustic power minimization control. In FIG. 10, the abscissa is the speaker interval, and the ordinate is the acoustic power decrease amount. Each curve shown in FIG. 10 represents a theoretical calculation amount of the acoustic power decrease amount calculated from equation (6) when the speaker interval is changed for voice signals having various frequencies. Referring to FIG. 10, the speaker interval between the speakers 104L and 104C is equal to that between the speakers 104C and 104R.

In FIG. 10, a region in which the acoustic power decrease amount is lower than 0 dB is a region having a speaker interval and a frequency by which the effect of the acoustic power minimization control appears. That is, when the speaker interval is constant, the influence of the interference between opposite-phase sounds increases as the frequency decreases, i.e., as the wavelength increases, so the acoustic power decrease amount increases. By contrast, when the frequency is constant, the overlapping of opposite-phase sounds increases and the acoustic power decrease amount increases as the speaker interval decreases. Thus, the kd value determines the theoretical limiting value of acoustic power equivalent to the energy of noise unique to a device. Accordingly, when the theoretical limiting value of the acoustic power decrease amount can be grasped, the acoustic power reducing effect can be found out before design.

The sound pressure is determined by the distance from a sound source having a given acoustic power value. Assuming that the space around the sound source is an ideal space, therefore, the acoustic power decrease amount in the sound source as an origin is equivalent to the sound pressure decrease amount in the space. Assume that when the acoustic power decrease amount is −7 dB, the sound pressure level decrease amount in a given point around the speaker is 15 dB. This decrease of the sound pressure level in the given point has occurred only locally due to the influence such as reflection. When the sound pressure level decreases at a given point, therefore, the sound pressure level increases at another point. That is, when the theoretical limiting value of the acoustic power decrease amount caused by, e.g., a restriction on the kd value is −7 dB, the limiting value of the sound pressure level uniformly decreased around the speaker is also −7 dB. Accordingly, in order to set the sound pressure level gradient, i.e., the sound pressure decrease amount at a desired level, it is necessary to select the speaker interval and the frequency based on the sound pressure level in the sound amplification area, which is increased by the sound amplification control, and on the theoretical limiting value of the acoustic power decrease amount for implementing the sound reduction areas around the speaker.

Assume that the speaker interval is selected such that the sound pressure level gradient between the sound amplification area and the sound reduction area is 10 dB. When the sound amplification magnification n is 2, a sound pressure level gradient of 10 dB between the sound amplification area and the sound reduction area is equivalent to an acoustic power decrease amount of −4 to −10 dB. In the example shown in FIG. 10, therefore, a combination of the speaker interval and the frequency capable of implement the sound pressure level gradient between the sound amplification area and the sound reduction area is a combination in the region of a range WR of the acoustic power decrease amount in FIG. 10.

Accordingly, when the frequency of a voice signal to be played back is, e.g., 1,500 Hz, the speaker interval can be determined within a range dR1. Likewise, when the frequency of a voice signal to be played back is 1,000 Hz, the speaker interval can be determined within a range dR2. Similarly, when the frequency of a voice signal to be played back is 500 Hz, the speaker interval can be determined within a range dR3.

Figure 11:
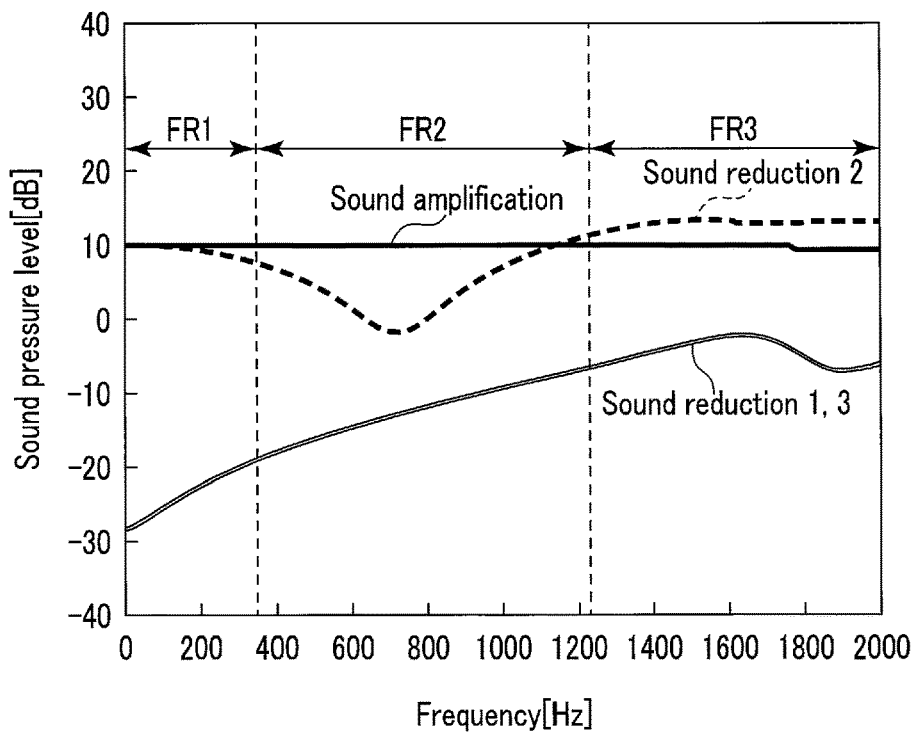
FIG. 11 is a view showing the calculation result of the relationship between the frequency and the sound pressure level in the sound amplification area and the sound reduction areas.

FIG. 11 is a view showing the calculation results of the relationship between the frequency and the sound pressure level in the sound amplification area and the sound reduction areas. Referring to FIG. 11, the abscissa indicates the frequency, and the ordinate indicates the sound pressure levels in the sound amplification area and the sound reduction areas 1, 2, and 3. In FIG. 11, the speaker interval is 0.1 m. In each of the sound amplification area and the sound reduction areas 1, 2, and 3, the sound pressure level of a sound collected by a microphone placed in a position far from the speaker 104C by 0.5 m is calculated. FIG. 12 is a view showing the relationship between each speaker interval and the frequency. In FIG. 12, the abscissa indicates the frequency, and the ordinate indicates the acoustic power decrease amount.

As shown in FIG. 11, the sound pressure level in the sound amplification area is an almost constant sound pressure level in a band from 0 to 2,000 Hz. Also, the sound pressure level in the sound reduction areas 1 and 3 increases as the frequency increases. However, the sound pressure level in the sound reduction areas 1 and 3 is sufficiently lower than that in the sound amplification area. Therefore, the sound reduction areas 1 and 3 have the effect of the acoustic power minimization control even in the range of 0 to 2,000 Hz.

In the sound reduction area 2, however, the sound pressure level largely exceeds 0 dB in a band FR1 from 0 to 350 Hz and in a band FR3 from 1,250 to 2,000 Hz. That is, the sound is amplified in the bands FR1 and FR3 of the sound reduction area 2.

As shown in FIG. 12, the acoustic power decrease amount is large in a band FR21 that is almost the same as the band FR1. Thus, the band FR21 is a band in which the acoustic power decrease amount obtained by the acoustic power minimization control is large, and is also a band in which the sound is amplified by the sound amplification control even in a position far from the sound amplification control point. As shown in FIG. 11, this sound amplification in the position far from the sound amplification control point decreases the sound pressure level gradient between the sound amplification area 2 and the sound reduction area in the band FR1.

Also, as shown in FIG. 12, the acoustic power decrease amount is small in a band FR23 that is almost the same as the band FR3. This means that almost no sound reduction is theoretically performed in the band FR23. As shown in FIG. 11, therefore, the sound pressure level gradient between the sound amplification area and the sound reduction area 2 in the band FR3 decreases.

As described above, no desired sound pressure level gradient can be obtained when the frequency is too high or too low, like the speaker interval. For example, therefore, it is possible to set the frequency shown in FIG. 12 at which the acoustic power decrease amount is 0 dB as a reference, and determine a frequency by using a frequency about half the reference frequency as the lower-limiting frequency in design. The upper-limiting frequency in design is about 1,400 Hz that is the lower-limiting frequency in FR23 shown in FIG. 12. Accordingly, the frequency can be determined within a range of 400 to 1,400 Hz when the speaker interval is, e.g., 0.15 m, within a range of 650 to 1,400 Hz when the speaker interval is, e.g., 0.10 m, and within a range of 700 to 1,400 Hz when the speaker interval is, e.g., 0.05 m.

Based on the concept as described above, when the frequency is fixed, the control device 103 determines the speaker interval from the range of speaker intervals corresponding to the frequency conditions shown in FIG. 10. On the other hand, when the speaker interval is fixed, the control device 103 determines the frequency within the range of frequencies corresponding to the speaker interval conditions shown in FIG. 12.

When both the speaker interval and the frequency are fixed, the speaker interval and the frequency may not be included in the range shown in FIG. 10 or 12. In this case, there is the possibility that no desired silencing is realized. Therefore, the control device 103 can perform adjustment for changing the frequency balance of a sound to be radiated from a speaker, or adjustment for changing the value of the gain G of a voice signal, in order to increase the energy contribution of the frequency band of the voice signal.

The explanation will return to FIG. 9. In step S4 after the speaker interval and the frequency are determined, the control device 103 determines the sound amplification control point. The sound amplification control point can be determined within, e.g., a range of 2 m×2 m based on the speaker 104C. The sound amplification control point can also be determined by accepting an input from the user or a worker in charge of setting the acoustic control apparatus 100. In this case, the control device 103 can perform, e.g., display for inputting the sound amplification control point. For example, it is possible to display a 2 m×2 m map centered around the speaker 104C. The user or the worker can designate, e.g., a given one point on this map as the sound amplification control point.

In step 35, the control device 103 measures transfer functions. As described earlier, transfer functions can be measured from microphone acquisition signals obtained by radiating sounds based on a random signal or a TSP (Time Stretched Pulse) signal from the speakers 104L, 104C, and 104R, and collecting the sounds by a microphone placed in the position of the sound amplification control point. It is also possible to previously measure transfer functions for a plurality of positions assumed as the sound amplification control points. In this case, the control device 103 acquires a transfer function corresponding to the sound amplification control point designated in step S4.

In step S6, the control device 103 calculates the filter coefficients qL, qC, and qR based on equation (9) from the sound amplification magnification, the speaker interval, the frequency, and the transfer function. Then, the control device 103 sets the filter coefficients qL, qC, and qR in the acoustic filters 1022L, 1022C, and 1022R, respectively. After that, the control device 103 terminates the processing of FIG. 9.

Figure 13C:
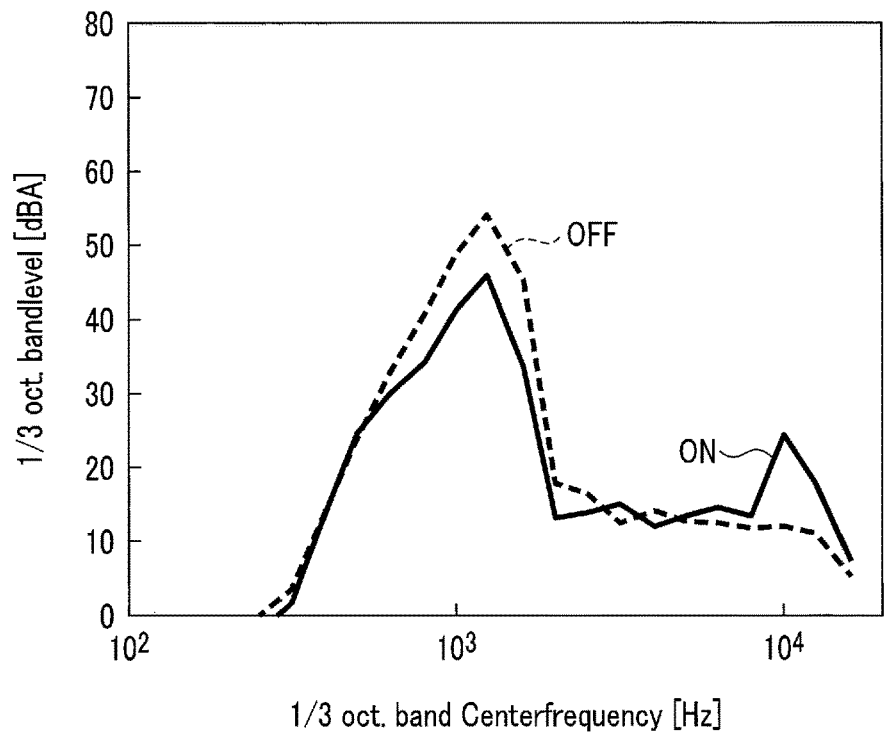
FIG. 13C is a view showing the results of an experiment of radiating sounds from speakers by using white noise as a sound source, collecting the sounds by using a microphone placed in a sound reduction area 3, and measuring the noise level of the collected sound.
Figure 13D:
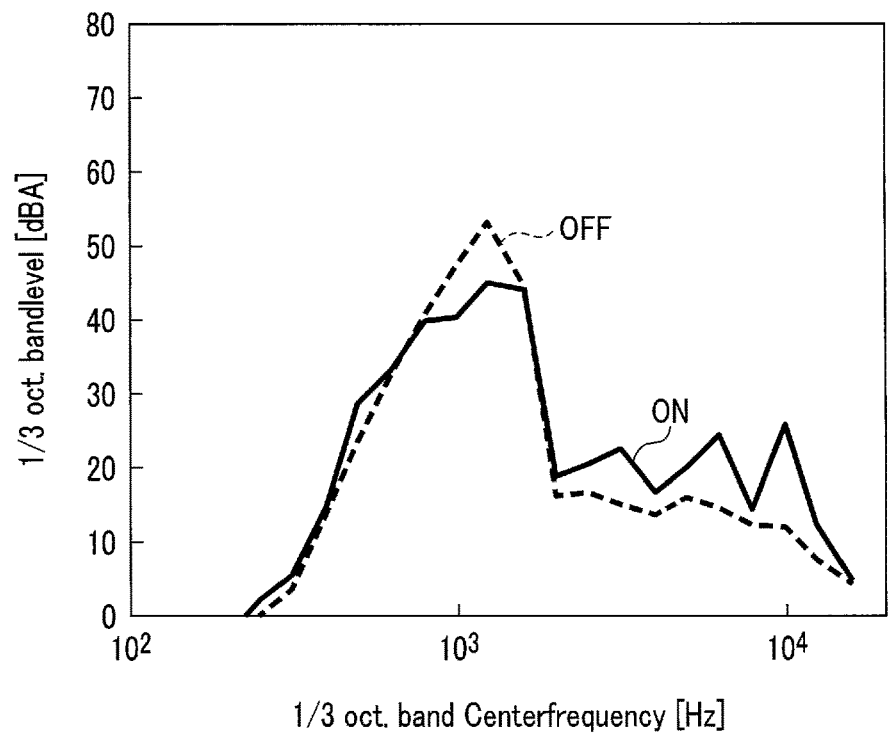
FIG. 13D is a view showing the results of an experiment of radiating sounds from speakers by using white noise as a sound source, collecting the sounds by using a microphone placed in a sound reduction area 2, and measuring the noise level of the collected sound.

FIGS. 13A, 13B, 13C, and 13D are views showing the results of an experiment for radiating sounds from speakers by using white noise as a sound source, collecting the sounds by a microphone placed in each area, and measuring the noise level of the collected sound, when the sound amplification area and the sound reduction areas are set as shown in FIG. 7A. In this experiment, the speaker interval is 10 cm. Also, the microphone is installed in a position 50 cm from the speaker 104C in each area. Furthermore, the white noise sound to be radiated from the sound source is a sound having a constant sound pressure level in an applied frequency band of 400 to 1,600 Hz that actualizes the sound pressure level gradient determined by the speaker interval. FIG. 13A shows the result in the sound amplification area, FIG. 13B shows the result in the sound reduction area 1, FIG. 13C shows the result in the sound reduction area 3, FIG. 13D shows the result in the sound reduction area 2. In FIGS. 13A, 13B, 13C, and 13D, the abscissa indicates the center frequency of a ⅓ octave band, and the ordinate indicates a ⅓ octave band level. Also, the result of OFF in FIGS. 13A, 13B, 13C, and 13D shows the result before the sound amplification control and the acoustic power minimization control, i.e., the result when only the speaker 104C radiated a sound. On the other hand, the result of ON in FIGS. 13A, 13B, 13C, and 13D shows the result after the sound amplification control and the acoustic power minimization control, i.e., the result when each of the speakers 104L, 104C, and 104R radiated a sound.

In the case of OFF, the decrease amounts of the sound pressure levels in the sound reduction areas 1, 2, and 3 with respect to the sound pressure level in the sound amplification area are respectively −0.6 dB, 0.1 dB, and −0.4 dB. In the case of ON, the decrease amounts of the sound pressure levels in the sound reduction areas 1, 2, and 3 with respect to the sound pressure level in the sound amplification area are respectively 14.1 dB, 12.7 dB, and 17.2 dB. This reveals that when the sound amplification control and the acoustic power minimization control are combined, an abrupt sound pressure level difference is produced even at a close distance.

In the first embodiment as explained above, the sound amplification control and the acoustic power minimization control are performed as they are combined. This makes it possible to produce an abrupt sound pressure difference between the sound amplification area and the sound reduction area. Accordingly, the first embodiment can facilitate transmitting a sound in only a specific direction.

Also, in the first embodiment, when the position of a speaker as a sound source and the position of a sound amplification control point are determined, an acoustic filter coefficient can be calculated if a corresponding transfer function is obtained. This obviates the need to fix the sound amplification control point. In addition, the sound amplification control and the acoustic power minimization control can be performed by only adjusting the acoustic filter coefficient. Accordingly, the acoustic control apparatus of the embodiment is applicable to environments in which audiences are not limited, such as an online meeting system and a public guidance.

Furthermore, in the first embodiment, the speaker interval and the frequency for the sound amplification control and the acoustic power minimization control can be designed based on the theoretical limiting value of the acoustic power decrease amount based on the kd value. That is, in the first embodiment, no excess engineering for designing the speaker interval and the frequency is necessary. In addition, when the calculated acoustic filter coefficient is set in the acoustic filter, the user of the acoustic control apparatus need not change the setting of the acoustic filter even when the characteristics of a surrounding room change. Moreover, it is also possible to use an acoustic filter coefficient calculated from characteristics measured using speaker A in a given band, and use an acoustic filter coefficient calculated from characteristics measured using speaker B in another band, i.e., it is possible to selectively use a plurality of acoustic filter coefficients. For example, if the acoustic power level reducing effect is bad when using the acoustic filter coefficient calculated from the characteristics measured using speaker A, it is possible to use the acoustic filter coefficient calculated from the characteristics measured using speaker B.

Second Embodiment

Next, the second embodiment will be explained. In the second embodiment, a repetitive explanation of the first embodiment will be omitted or simplified.

In the first embodiment as shown in FIGS. 13A, 13B, 13C, and 13D, a difference in sound pressure level can be produced between the sound amplification area and the sound reduction areas 1, 2, and 3 when the control is ON. On the other hand, the difference in sound pressure level in the sound reduction area 2 from the sound amplification area is smaller than those in the sound reduction areas 1 and 3. This is so because, as described earlier, the interference between the sounds radiated from the speakers 104L and 104R is large in the sound reduction areas 1 and 3. When the sound pressure level decreases at a given point in the acoustic power minimization control, the sound pressure level increases at another point. An area in which the sound pressure level increases is the sound reduction area 2. As shown in FIG. 13D, even the sound reduction area 2 has a sound pressure level difference of 12 dB or more, but a larger sound pressure level difference is necessary depending on a use scene. In the second embodiment, a large sound pressure level gradient is obtained as a whole by suppressing a decrease in sound pressure level in a sound reduction area in which the sound pressure level is excessively decreasing.

FIG. 14 is a view showing an example of the configuration of an acoustic control apparatus according to the second embodiment. In FIG. 14, an explanation of the same parts as in FIG. 1 will be omitted. In the second embodiment, a voice signal processing device 102 includes phase shifters 1023L, 1023C, and 1023R. The rest of the arrangement of the second embodiment is the same as that of the first embodiment.

In sound reduction areas 1 and 3, the sound pressure level has an excessively small value, i.e., has a node due to the sound pressure interference between a sound radiated from a speaker 104L and a sound radiated from a speaker 104R. In the second embodiment, therefore, the speakers radiate sounds so as to decrease the sound pressure interference in the sound reduction areas 1 and 3. More specifically, sounds radiated from the speakers 104L and 104R and a speaker 104C are changed into traveling waves. The phase shifters 1023L, 1023C, and 1023R are installed for this purpose.

The phase shifter 1023L shifts the phase of a voice signal input from an amplifier 1021 by HL and outputs the signal to an acoustic filter 1022L. The phase shifter 1023C shifts the phase of a voice signal input from the amplifier 1021 by HC and outputs the signal to an acoustic filter 1022C. The phase shifter 1023R shifts the phase of a voice signal input from the amplifier 1021 by HR and outputs the signal to an acoustic filter 1022R. HL is, e.g., 240°, HC is, e.g., 0°, and HR is, e.g., 120°. Since the phases of the voice signals are shifted 120° by the phase shifters 1023L, 1023C, and 1023R, the phases of the sounds radiated from the speakers 104L, 104C, and 104R are also shifted every 120°. Accordingly, the sounds radiated from the speakers 104L, 104C, and 104R flow as traveling waves toward, e.g., the sound amplification area. In this case, the sound pressure interference in the sound reduction areas 1 and 3 decreases.

Figure 15:
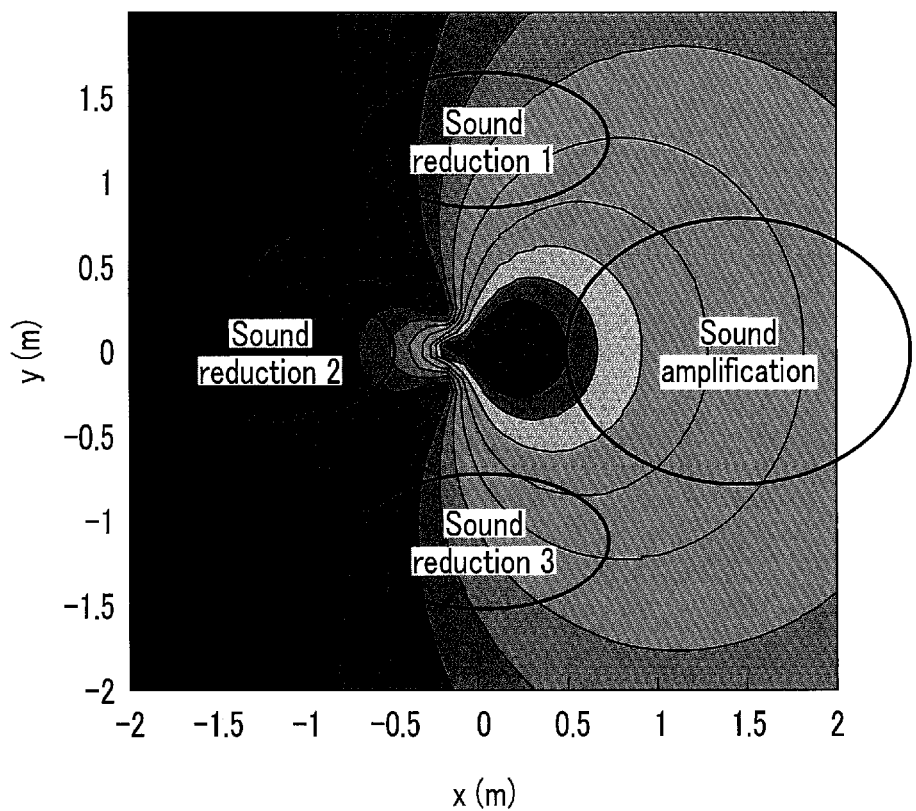
FIG. 15 is a view showing examples of sound pressure level distributions in a sound amplification area and sound reduction areas when these areas are set as shown in FIG. 7A and a sound is radiated by a traveling wave by using the acoustic filter coefficient set in accordance with the result of equation (9).
Figure 16A:
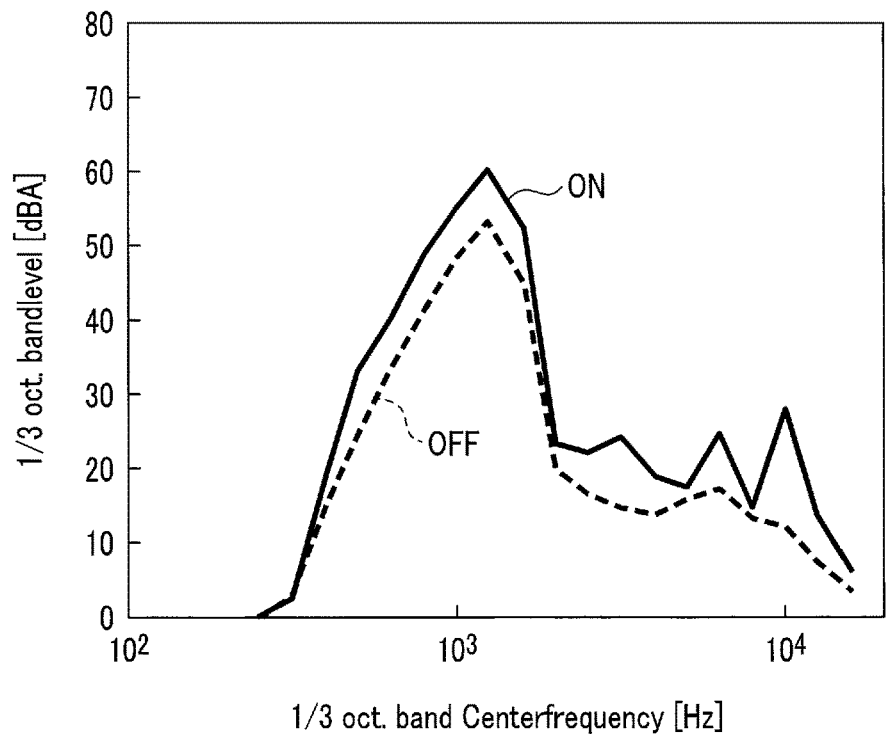
FIG. 16A is a view showing the results of an experiment similar to that shown in FIG. 13A, when the experiment was conducted by changing the sound to be radiated from speakers to a traveling wave.
Figure 16B:
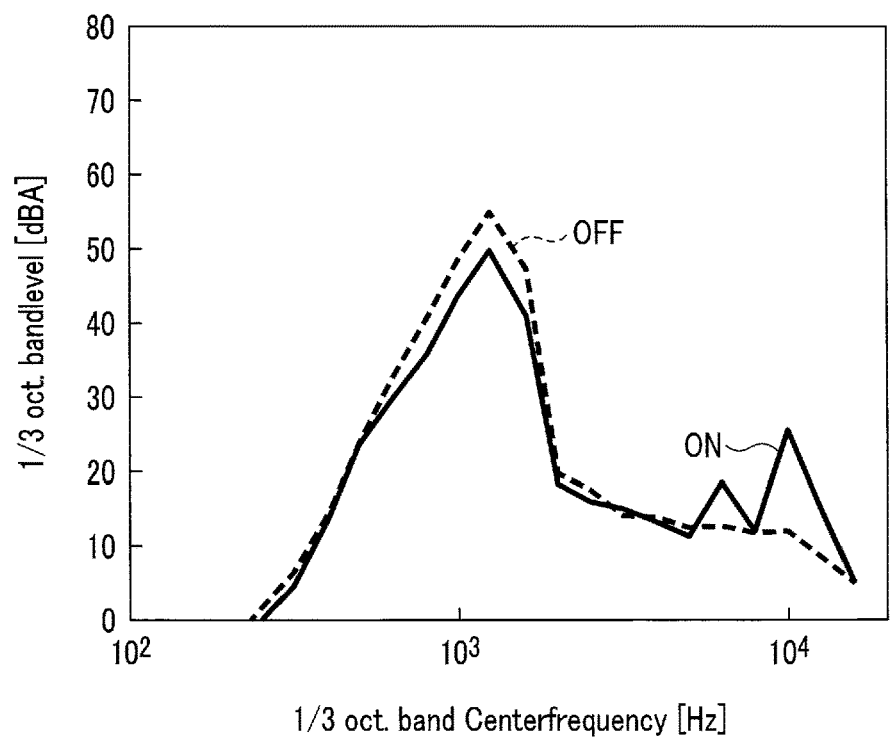
FIG. 16B is a view showing the results of an experiment similar to that shown in FIG. 13B, when the experiment was conducted by changing the sound to be radiated from speakers to a traveling wave.

FIG. 15 shows an example of the distribution of sound pressure levels in the sound amplification area and the sound reduction areas set as shown in FIG. 7A, when sounds are radiated as traveling waves by using acoustic filter coefficients set in accordance with the results of equation (9). Like FIG. 7B, this distribution shown in FIG. 15 represents the magnitude of the sound pressure level by the density. An opposite-phase sound disappears because the sound radiated from the speaker is changed into a traveling wave. Therefore, the nodes of the sound pressure levels in the sound reduction areas 1 and 3 disappear, so the distribution tendency changes. Since the sound amplification control is also performed in this state, the sound pressure level decreases in particularly the sound reduction area 2 compared to FIG. 7B.

FIGS. 16A, 16B, 16C, and 16D are views showing the results of experiments when the same experiments as shown in FIGS. 13A, 13B, 13C, and 13D were conducted by changing the sounds radiated from the speakers into traveling waves.

When the control is OFF, the decrease amounts of the sound pressure levels in the sound reduction areas 1, 2, and 3 are respectively −1.5 dB, 0.3 dB, and −0.7 dB with respect to the sound amplification area. On the other hand, when the control is ON, the decrease amounts of the sound pressure levels in the sound reduction areas 1, 2, and 3 are respectively 10.2 dB, 13.8 dB, and 13.7 dB with respect to the sound amplification area. The decrease amount of the sound pressure level in the sound reduction area 2 improved to the same level as that in the sound reduction areas 1 and 3. On the other hand, the decrease amounts of the sound pressure levels in the sound reduction areas 1 and 3 apparently increased, but a decrease amount of 15 dB or more is sufficiently effective. Even when the decrease amounts of the sound pressure levels in the sound reduction areas 1 and 3 more or less deteriorate, an application range in a use scene can be extended by improving the decrease amount of the sound pressure level in the sound reduction area 2. That is, the second embodiment can adjust the sound reduction areas in accordance with scenes as described above by only switching the phases of the phase shifters.

In the second embodiment as explained above, phase correction is performed on a voice signal, so sound amplification control and acoustic power minimization control are performed while changing a sound radiated from a speaker into a traveling wave. This makes it possible to reduce excess sound pressure interference in the sound reduction area, and suppress variations in decrease amounts of the sound pressure levels in the sound reduction areas.

Referring to FIG. 14, the phase shifters 1023L, 1023C, and 1023R are respectively installed in the input stages of the acoustic filters 1022L, 1022C, and 1022R. However, the phase shifters 1023L, 1023C, and 1023R may also be respectively installed in the output stages of the acoustic filters 1022L, 1022C, and 1022R.

Also, in this embodiment, three phase shifters are installed because the number of speakers is 3. However, the number of phase shifters need only be the same as the number of speakers and is not limited to 3. When the number of speakers is m, a phase correction amount $\theta i$ ($i=1, 2, \ldots, m$) of the ith speaker can be $\theta i = \exp(j \times 2\pi i/m)$.

Third Embodiment

The third embodiment will be explained below. In the third embodiment, a repetitive explanation of the first or second embodiment will be omitted or simplified.

In the second embodiment, phase correction is performed on a voice signal. However, an effect equal to that of the phase correction can be obtained by further reducing the gain of a sound radiated from a speaker farthest from a sound amplification control point.

Figure 17:
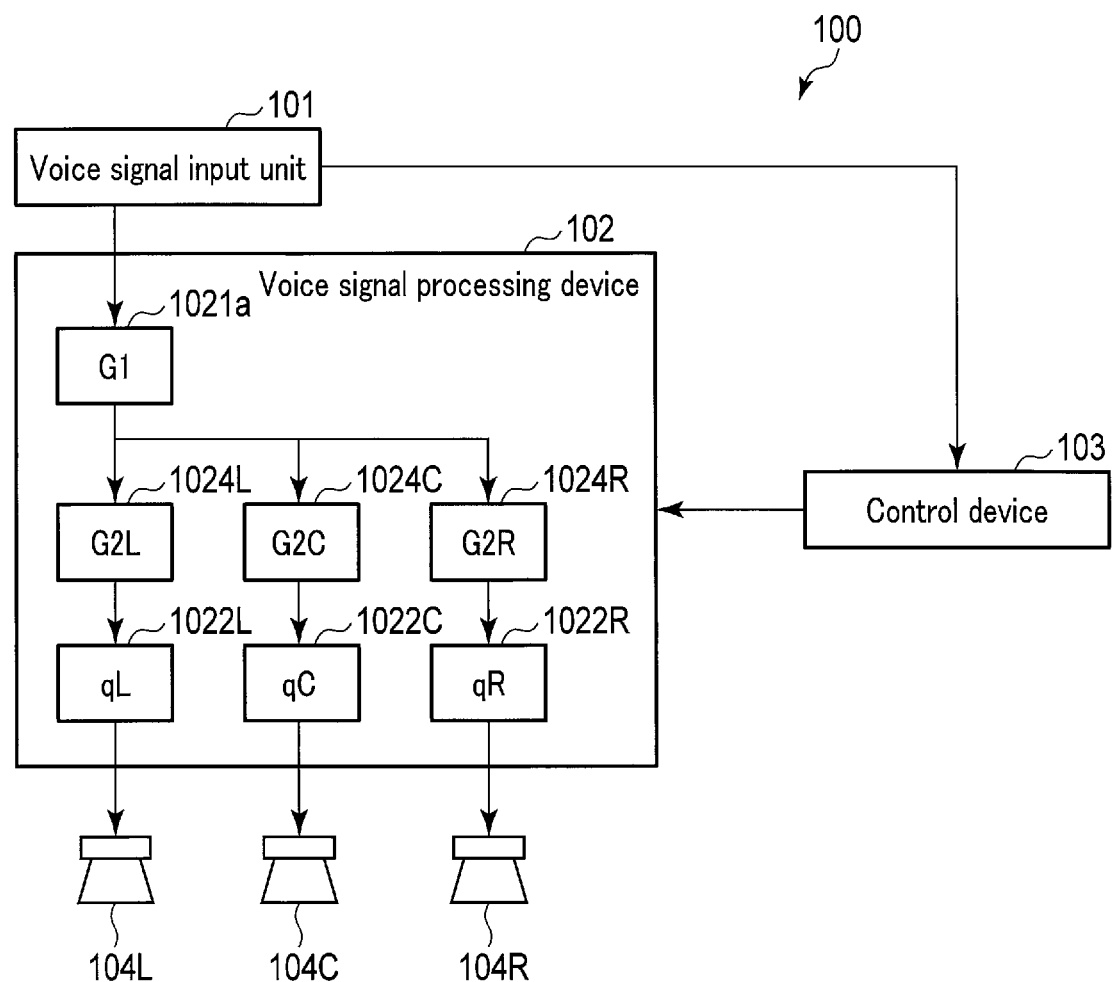
FIG. 17 is a view showing an example of the configuration of an acoustic control apparatus according to the third embodiment.

FIG. 17 is a view showing an example of the configuration of an acoustic control apparatus according to the third embodiment. In FIG. 17, an explanation of the same parts as shown in FIG. 1 will be omitted. In the third embodiment, a voice signal processing device 102 includes an amplifier 1021a and amplifiers 1024L, 1024C, and 1024R. The rest of the arrangement of the third embodiment is the same as that of the first embodiment.

The amplifier 1021a amplifies a voice signal input from a voice signal input unit 101 by a gain G1. The gain G1 is equal to the gain G. That is, the amplifier 1021a is the same as the amplifier 1021.

The amplifier 1024L attenuates the voice signal input from the voice signal input unit 101 via the amplifier 1021a by a gain G2L. The amplifier 1024C attenuates the voice signal input from the voice signal input unit 101 via the amplifier 1021a by a gain G2C. The amplifier 1024R attenuates the voice signal input from the voice signal input unit 101 via the amplifier 1021a by a gain G2R. For example, of the gains G2L, G2C, and G2R, the gain of an amplifier corresponding to a speaker farthest from the sound amplification control point is smaller than 1, and the gain of an amplifier corresponding to a speaker other than the speaker farthest from the sound amplification control point is 1. For example, when the sound amplification area and the sound reduction areas are set as shown in FIG. 7A, a speaker farthest from the sound amplification control point, i.e., the sound amplification area is a speaker 104L. Accordingly, the gain G2L has a value smaller than 1, e.g., 0.6. On the other hand, the gains G2C and G2R are 1.

FIG. 18A is a view showing the calculation results of the relationship between the sound pressure levels of the sound amplification area and sound reduction areas 1, 2, and 3 for each frequency, when gain correction of an acoustic filter coefficient qL is not taken into consideration. When the sound amplification area and the sound reduction areas 1, 2, and 3 are set as shown in FIG. 7A, the decrease of the sound pressure level in the sound reduction areas 1 and 3 is larger than that in the sound reduction area 2 as shown in FIG. 18A. Therefore, decreasing the sound pressure level in the sound reduction area 2 is more important than further decreasing the sound pressure level in the sound reduction areas 1 and 3, in order to obtain a sufficient sound pressure level gradient between the sound amplification area and the sound reduction areas.

FIG. 18B is a view showing the calculation results of the relationship between the sound pressure levels of the sound amplification area and sound reduction areas 1, 2, and 3 for each frequency, when gain correction of the acoustic filter coefficient qL is taken into consideration. As shown in FIG. 18B, since the acoustic filter coefficient qL becomes further smaller than the value indicated by equation (9), the sound pressure level in the sound reduction area 2 decreases at, e.g., 600 to 800 Hz. On the other hand, the sound pressure level in the sound reduction areas 1 and 3 increases in the same band. This tendency increases as the value of the gain G2L decreases. That is, when the sound pressure level in the sound reduction area 2 is decreased too much, the sound pressure level in the sound reduction areas 1 and 3 increases accordingly, and as a consequence no sufficient sound pressure level gradient can be obtained. In this example, the decrease amounts of the sound pressure levels in the sound reduction areas 1, 2, and 3 are almost equal when the value of the gain G2L is 0.6 to 0.7.

In the third embodiment as explained above, variations in decrease amounts of the sound pressure levels in the individual sound reduction areas can be suppressed by gain correction instead of phase correction.

Note that the voice signal processing device 102 of the third embodiment does not include phase shifters 1023L, 1023C, and 1023R. However, the voice signal processing device 102 of the third embodiment can also include the phase shifters 1023L, 1023C, and 1023R. That is, phase correction and gain correction can also be combined.

Note also that only the gain of the amplifier 1024L is decreased in the example explained in the third embodiment, but the present invention is not limited to this. Gain correction can also be performed by using the gains of the amplifiers 1024C and 1024R as well. For example, the values of the gains G2L, G2C, and G2R can be adjusted in accordance with the distance from the sound amplification control point.

(Other Modifications)

Figure 19:
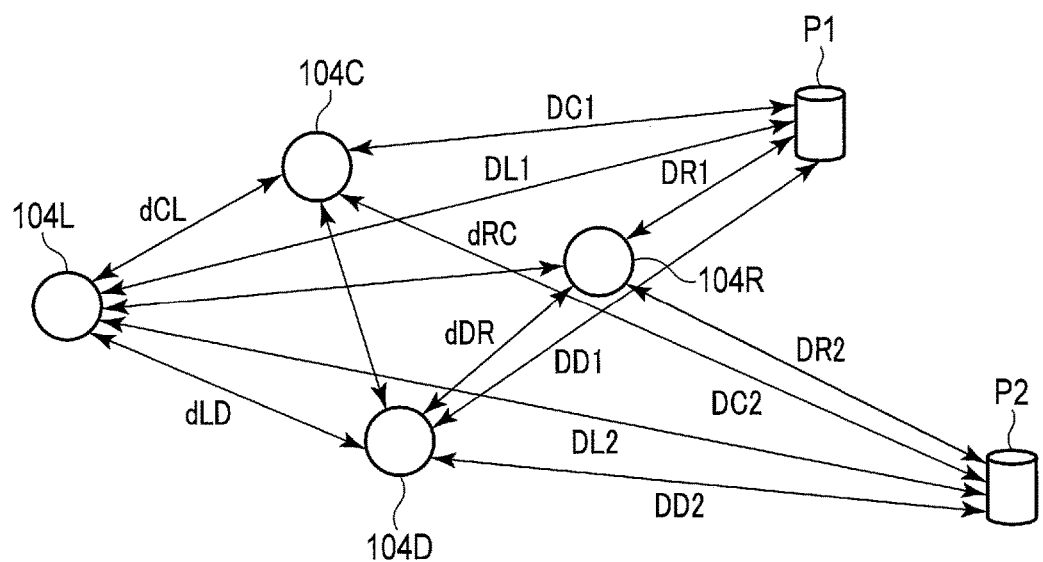
FIG. 19 is a view showing an example of the setting of sound amplification control points when the number of speakers is 4.

In each of the above-described embodiments, the number of speakers is 3. However, the number of speakers need only be 2 or more. Especially when the number of speakers is 3 or more, the number of sound amplification control points can be 2 or more. More specifically, when the number of speakers is m, the number of sound amplification control points can be (m−1). FIG. 19 is a view showing a setting example of the sound amplification control points when the number of speakers is 4. Referring to FIG. 19, four speakers 104L, 104C, 104R, and 104D are arranged in four directions, i.e., up, down, left, and right. Two sound amplification control points P1 and P2 are arranged in an upper right position and a lower right position when viewed from the speaker 104R on the right side.

Even in a case like this, acoustic filter coefficients qL, qC, qR, and qD of the speakers 104L, 104C, 104R, and 104D can be calculated from speaker intervals dCL, dRC, dDR, and dLD between the speakers, the frequency of a voice signal, transfer functions DL1, DC1, DR1, and DD1 between the sound amplification control point P1 and the speakers 104L, 104C, 104R, and 104D, and transfer functions DL2, DC2, DR2, and DD2 between the sound amplification control point P2 and the speakers 104L, 104C, 104R, and 104D.

When the number of sound amplification control points is 2 or more, the two or more sound amplification control points can be set in one sound amplification area and can also be set in different sound amplification areas. When the two or more sound amplification control points are set in one sound amplification area, the two sound amplification control points can undergo the sound amplification control by the same sound amplification magnification as explained in the first embodiment, and can also undergo the sound amplification control by different sound amplification magnifications. For example, when the number of sound amplification control points is 3, it is possible to set a first sound amplification control point having a sound amplification magnification of ×2 in one sound amplification area, set a second sound amplification control point having a sound amplification magnification of ×1 after the first sound amplification control point, and set a third sound amplification control point having a sound amplification magnification of ×0.1 after the second sound amplification control point. In this case, a sound pressure level gradient can form even in one sound amplification area. Note that when the sound amplification control is performed on a plurality of sound amplification control points by different sound amplification magnifications, equations (2) and (3) can be calculated for each sound amplification control point.

Figure 20:
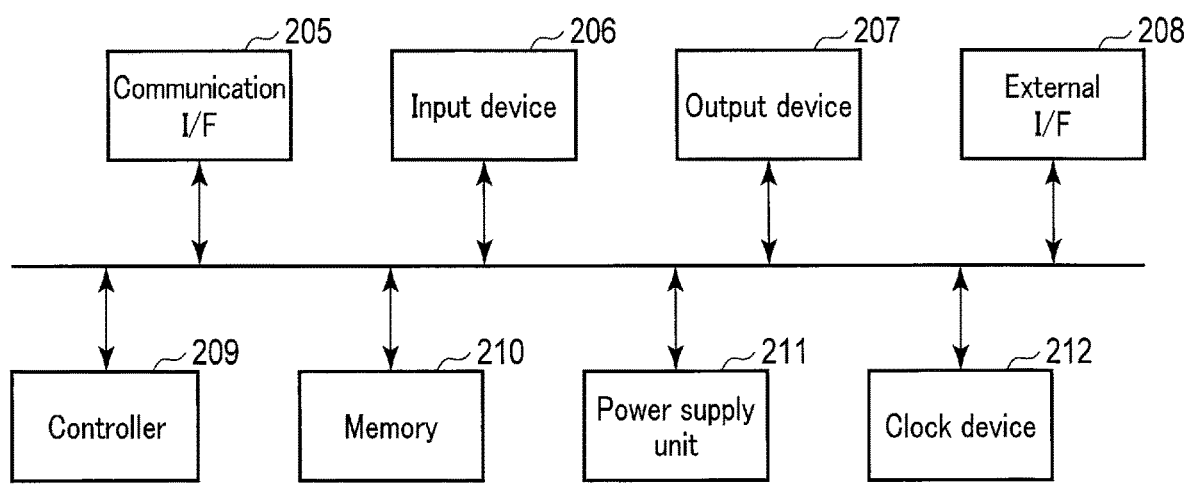
FIG. 20 is a view showing an example of the hardware configuration of the acoustic control apparatus explained in each embodiment.

Next, an example of the hardware configuration of the acoustic control apparatus 100 explained in each of the above-described embodiments will be explained with reference to FIG. 20. FIG. 20 is a view showing the example of the hardware configuration of the acoustic control apparatus 100.

As shown in FIG. 20, the acoustic control apparatus includes a computer in which a controller 209, a memory 210, a power supply unit 211, a clock device 212, a communication interface (I/F) 205, an input device 206, an output device 207, and an external interface (I/F) 208 are electrically connected.

The controller 209 includes a CPU (Central Processing Unit), a RAM (Random Access Memory), and/or a ROM (Read Only Memory), and controls each constituent element in accordance with information processing. The controller 209 can operate as the voice signal input unit 101, the voice signal processing device 102, and the control device 103. The controller 209 can read out an execution program stored in the memory 210 and execute processing.

The memory 210 is a medium for storing information such as a program so that a computer, a machine, and the like can read the program. The memory 210 can also store information of the speaker interval, information of the frequency of a voice signal, and information of a transfer function. The memory 210 can be an auxiliary storage device such as a hard disk drive or a solid-state drive. Furthermore, the memory 210 can include a drive. The drive is a device for reading out data stored in another auxiliary storage device, a recording medium, and the like, and includes a semiconductor memory drive (a flash memory drive), a CD (Compact Disk) drive, a DVD (Digital Versatile Disk) drive, and the like. The type of drive can appropriately be selected in accordance with the type of storage medium.

The power supply unit 211 supplies electric power to each element of the acoustic control apparatus 100. The power supply unit 211 can also supply electric power to each element of an apparatus including the acoustic control apparatus 100. The power supply unit 211 can include a secondary battery or an AC power supply.

The clock device 212 is a device for measuring time. For example, the clock device 212 can be a clock including a calendar, and transfers information of the present year and month and/or date and time to the controller 209. The clock device 212 can be used to give the date and time to a voice signal to be played back.

The communication interface 205 is, e.g., a near field wireless communication (e.g., Bluetooth©) module, a wired LAN (Local Area Network) module, or a wireless LAN module, and is an interface for performing wired or wireless communication across a network. This communication across a network can be either wireless communication or wired communication. Note that the network can be an internetwork including the Internet, and can also be another kind of network such as an office LAN. The communication interface 205 can further perform one-to-one communication using a USB (Universal Serial Bus) cable or the like. In addition, the communication interface 205 can include a micro USB connector. The communication interface 205 is an interface for connecting the acoustic control apparatus to external devices such as automobiles, trains, and electrical appliances in houses, and various kinds of communication devices. The communication interface 205 is controlled by the controller 209, and receives various kinds of information from the external device across a network or the like. The various kinds information include, e.g., information of the speaker interval, information of the frequency of a voice signal, and information of a transfer function, set in the external device.

The input device 206 is a device for accepting inputs, and can be a touch panel, a physical button, a mouse, a keyboard, and the like. The output device 207 includes devices for outputting information, such as a display that outputs information by display or speakers that output information by a voice. The information of the speaker interval, the information of the frequency of a voice signal, and the information of a transfer function can also be input via the input device 206.

The external interface 208 mediates between the main body of the acoustic control apparatus and an external device. The external device can be, e.g., a printer, a memory, or a communication device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An acoustic control apparatus comprising:
a voice signal input receiver configured to receive an input of at least one voice signal;
a processor including hardware configured to:
calculate a first relational expression between acoustic filter coefficients of acoustic filters to be applied to the at least one voice signal containing information of sounds played back by two or more sound sources, based on an amplification magnification in a sound amplification control point with respect to the sounds played back by the two or more sound sources, and on transfer functions between the sound amplification control point and the two or more sound sources;
calculate a second relational expression between the acoustic filter coefficients, based on information of a frequency of the at least one voice signal, and on an interval between the two or more sound sources;
calculate the acoustic filter coefficients based on the first relational expression and the second relational expression;
filter the at least one voice signal based on the calculated acoustic filter coefficients; and
output the filtered voice signal to the two or more sound sources,
wherein the first relational expression is given the following equation $$qL = -\frac{(1-n) \cdot \sum DCj \cdot DCj^* \cdot qC + \sum DRj \cdot DRj^* \cdot qR}{\sum DLj \cdot DLj^*},$$

and
the second relational expression is given by the following equation $$qL = -\left(\frac{\sin k dLC}{k dLC} qC + \frac{\sin k dRL}{k dRL} qR\right),$$

wherein qL, gC, and qR are complex volume velocities of respective sound sources, DC, RD, and DL are transfer functions between respective sound sources and amplification control points, dLC and dRL are sound source intervals between respective sound sources, n is a predetermined sound amplification magnification value, and/is a number of sound application control points.

2. The apparatus according to claim 1, wherein the processor calculates the second relational expression such that an acoustic power of the two or more sound sources is minimized.

3. The apparatus according to claim 2, wherein a minimum value of the acoustic power is determined based on a theoretical limiting value of a decrease amount of the acoustic power, which is determined by the frequency and the interval.

4. The apparatus according to claim 3, wherein if the frequency is predetermined, the interval is determined based on the predetermined frequency and the theoretical limiting value.

5. The apparatus according to claim 3, wherein if the interval is predetermined, the frequency is determined based on the predetermined interval and the theoretical limiting value.

6. The apparatus according to claim 1, further comprising phase shifters installed in one-to-one correspondence with the two or more sound sources, and configured to correct phases of the at least one voice signal containing information of the sounds played back by the two or more sound sources, such that the sounds played back by the two or more sound sources become traveling waves.

7. The apparatus according to claim 1, further comprising amplifiers installed in one-to-one correspondence with the two or more sound sources, and configured to attenuate the at least one voice signal containing information of the sounds played back by the two or more sound sources, by gains corresponding to distances from the sound amplification control point to the two or more sound sources, and to reduce values of the acoustic filter coefficients.

8. A non-transitory storage medium storing a computer-readable program for causing a computer to execute:
receive an input of at least one voice signal;
calculate a first relational expression between acoustic filter coefficients of acoustic filters to be applied to the at least one voice signal containing information of sounds played back by two or more sound sources, based on an amplification magnification in a sound amplification control point with respect to the sounds played back by the two or more sound sources, and on transfer functions between the sound amplification control point and the two or more sound sources;

calculate a second relational expression between the acoustic filter coefficients, based on information of a frequency of the voice signals, and on an interval between the two or more sound sources;

calculate the acoustic filter coefficients based on the first relational expression and the second relational expression;

filter the at least one voice signal based on the calculated acoustic filter coefficients; and output the filtered voice signal to the two or more sound sources, wherein the first relational expression is given the following equation $$qL = -\frac{(1-n)\cdot \sum DCj \cdot DCj^* \cdot qC + \sum DRj \cdot DRj^* \cdot qR}{\sum DLj \cdot DLj^*},$$

and the second relational expression is given by the following equation $$qL = -\left(\frac{\sin kdLC}{kdLC}qC + \frac{\sin kdRL}{kdRL}qR\right),$$

wherein qL, qC, and qR are complex volume velocities of respective sound sources, DC, RD, and DL are transfer functions between respective sound sources and amplification control points, dLC and dRL are sound source intervals between respective sound sources, n is a predetermined sound amplification magnification value, and/is a number of sound application control points.

9. An acoustic control method comprising:

receiving an input of at least one voice signal;

calculating a first relational expression between acoustic filter coefficients of acoustic filters to be applied to the at least one voice signal containing information of sounds played back by two or more sound sources, based on an amplification magnification in a sound amplification control point with respect to the sounds played back by the two or more sound sources, and on transfer functions between the sound amplification control point and the two or more sound sources;

calculating a second relational expression between the acoustic filter coefficients, based on information of a frequency of the at least one voice signal, and on an interval between the two or more sound sources; and calculating the acoustic filter coefficients based on the first relational expression and the second relational expression;

filtering the at least one voice signal based on the calculated acoustic filter coefficients; and outputting the filtered voice signal to the two or more sound sources, wherein the first relational expression is given the following equation $$qL = -\frac{(1-n)\cdot \sum DCj \cdot DCj^* \cdot qC + \sum DRj \cdot DRj^* \cdot qR}{\sum DLj \cdot DLj^*},$$

and the second relational expression is given by the following equation $$qL = -\left(\frac{\sin kdLC}{kdLC}qC + \frac{\sin kdRL}{kdRL}qR\right),$$

wherein qL, qC, and qR are complex volume velocities of respective sound sources, DC, RD, and DL are transfer functions between respective sound sources and amplification control points, dLC and dRL are sound source intervals between respective sound sources, n is a predetermined sound amplification magnification value, and i is a number of sound application control points.

\* \* \* \* \*